US012408696B2

(12) United States Patent
He et al.

(10) Patent No.: US 12,408,696 B2
(45) **Date of Patent: *Sep. 9, 2025**

(54) AEROSOL-FORMING ARTICLE

(71) Applicant: SHENZHEN SMOORE TECHNOLOGY LIMITED, Guangdong (CN)

(72) Inventors: Danchong He, Shenzhen (CN); Zhihua Wen, Shenzhen (CN); Pifa Shen, Shenzhen (CN); Fenglei Xing, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 410 days.

This patent is subject to a terminal disclaimer.

(21) Appl. No.: 17/866,872

(22) Filed: Jul. 18, 2022

(65) Prior Publication Data

US 2023/0037042 A1 Feb. 2, 2023

(30) Foreign Application Priority Data

Jul. 28, 2021 (CN) ......................... 202110857437.7

(51) Int. Cl.
*A24D 1/20* (2020.01)
*A24D 1/02* (2006.01)
(Continued)

(52) U.S. Cl.
CPC ................. *A24D 1/20* (2020.01); *A24D 1/02* (2013.01); *A24F 40/20* (2020.01); *A24F 40/465* (2020.01); *H05B 6/105* (2013.01)

(58) Field of Classification Search
CPC .. A24D 1/02; A24D 1/20; A24F 40/20; A24F 40/465; H05B 6/105
See application file for complete search history.

(56) References Cited

U.S. PATENT DOCUMENTS

2016/0360785 A1 12/2016 Bless et al.
2017/0055574 A1* 3/2017 Kaufman et al. ..... A24F 47/004
(Continued)

FOREIGN PATENT DOCUMENTS

CA 3047236 A1 6/2018
CN 104068473 A 10/2014
(Continued)

OTHER PUBLICATIONS

Japanese Patent Office, Office Action in Japanese Patent Application No. 2022-118458 (Oct. 10, 2023).
(Continued)

*Primary Examiner* — Michael H. Wilson
*Assistant Examiner* — Ronnie Kirby Jordan
(74) *Attorney, Agent, or Firm* — Leydig, Voit & Mayer, Ltd.

(57) ABSTRACT

An aerosol-forming article includes: an aerosol-forming substrate; a heating layer encircling a concave portion, the aerosol-forming substrate being arranged in the concave portion; and a cover layer covering at least a part of the heating layer and an opening of the concave portion. The aerosol-forming substrate is located between the heating layer and the cover layer. A through hole is provided at a position of the cover layer corresponding to the opening. The heating layer generates eddy currents in a magnetic field to generate heat so as to heat the aerosol-forming substrate to form aerosols.

10 Claims, 11 Drawing Sheets

(51) Int. Cl.

| | |
|---|---|
| ***A24F 40/20*** | (2020.01) |
| ***A24F 40/465*** | (2020.01) |
| ***H05B 6/10*** | (2006.01) |

(56) References Cited

U.S. PATENT DOCUMENTS

| | | | | |
|---|---|---|---|---|
| 2017/0318862 | A1 | 11/2017 | Mironov et al. | |
| 2018/0184712 | A1 | 7/2018 | Fraser et al. | |
| 2018/0199630 | A1 | 7/2018 | Qiu | |
| 2018/0271153 | A1* | 9/2018 | John et al. | A24F 47/008 |
| 2018/0317555 | A1 | 11/2018 | Blandino et al. | |
| 2018/0368475 | A1 | 12/2018 | Smith et al. | |
| 2019/0208827 | A1* | 7/2019 | Mironov | A24F 40/70 |
| 2019/0216135 | A1 | 7/2019 | Guo et al. | |
| 2019/0297946 | A1 | 10/2019 | Fu et al. | |
| 2020/0000148 | A1* | 1/2020 | Horrod et al. | A24F 47/008 |
| 2020/0229511 | A1 | 7/2020 | Wang et al. | |
| 2021/0153552 | A1* | 5/2021 | Taurino | A61M 11/042 |
| 2021/0161201 | A1 | 6/2021 | Aoun et al. | |
| 2021/0186104 | A1* | 6/2021 | Mironov | A24F 40/42 |
| 2021/0204604 | A1* | 7/2021 | Mironov | H05B 6/105 |
| 2024/0225100 | A1* | 7/2024 | Qian et al. | A24F 40/42 |

FOREIGN PATENT DOCUMENTS

| | | | | |
|---|---|---|---|---|
| CN | 104135881 | B | 11/2016 | |
| CN | 106659247 | A | 5/2017 | |
| CN | 107373761 | A | 11/2017 | |
| CN | 107427086 | A | 12/2017 | |
| CN | 104470386 | B | 1/2018 | |
| CN | 107846987 | A | 3/2018 | |
| CN | 107920598 | A | 4/2018 | |
| CN | 107920600 | A | 4/2018 | |
| CN | 107949285 | A | 4/2018 | |
| CN | 207355483 | U | 5/2018 | |
| CN | 108366627 | A | 8/2018 | |
| CN | 108430239 | A | 8/2018 | |
| CN | 208160043 | U | 11/2018 | |
| CN | 109068752 | A | 12/2018 | |
| CN | 109275963 | A | 1/2019 | |
| CN | 110178443 | A | 8/2019 | |
| CN | 110213973 | A | 9/2019 | |
| CN | 110352016 | A | 10/2019 | |
| CN | 209749814 | U | 12/2019 | |
| CN | 110771960 | A | 2/2020 | |
| CN | 210169064 | U | 3/2020 | |
| CN | 111011932 | A | 4/2020 | |
| CN | 210642459 | U | 6/2020 | |
| CN | 111372480 | A | 7/2020 | |
| CN | 111387566 | A | 7/2020 | |
| CN | 111466618 | A | 7/2020 | |
| CN | 210960421 | U | 7/2020 | |
| CN | 211746979 | U | 10/2020 | |
| CN | 112135533 | A | 12/2020 | |
| CN | 212279879 | U | 1/2021 | |
| CN | 112584712 | A | 3/2021 | |
| CN | 112638183 | A | 4/2021 | |
| CN | 112822951 | A | 5/2021 | |
| CN | 112841738 | A | 5/2021 | |
| CN | 113100484 | A | 7/2021 | |
| CN | 213719921 | U | 7/2021 | |
| CN | 216135176 | U | 3/2022 | |
| CN | 216135177 | U | 3/2022 | |
| CN | 216135178 | U | 3/2022 | |
| CN | 216135179 | U | 3/2022 | |
| CN | 216293004 | U | 4/2022 | |
| CN | 216315588 | U | 4/2022 | |
| CN | 216453387 | U | 5/2022 | |
| EA | 012883 | B1 | 12/2009 | |
| EP | 3476230 | A1 | 5/2019 | |
| EP | 3782491 | A1 | 2/2021 | |
| JP | 2005516647 | A | 6/2005 | |
| JP | 200935723 | A | 2/2009 | |
| JP | 2017520263 | A | 7/2017 | |
| JP | 2018504127 | A | 2/2018 | |
| JP | 2018528767 | A | 10/2018 | |
| JP | 2019520043 | A | 7/2019 | |
| JP | 2020503877 | A | 2/2020 | |
| JP | 2020505073 | A | 2/2020 | |
| JP | 2020516306 | A | 6/2020 | |
| JP | 2020529214 | A | 10/2020 | |
| JP | 2021513339 | A | 5/2021 | |
| KR | 1020180059916 | A | 6/2018 | |
| KR | 1020200011941 | A | 2/2020 | |
| KR | 1020210021069 | A | 2/2021 | |
| KR | 1020210043285 | A | 4/2021 | |
| KR | 1020210089736 | A | 7/2021 | |
| RU | 2531890 | C2 | 10/2014 | |
| RU | 2685029 | C2 | 4/2019 | |
| RU | 2685285 | C2 | 4/2019 | |
| RU | 2731860 | C2 | 9/2020 | |
| RU | 2733243 | C1 | 9/2020 | |
| RU | 2741921 | C1 | 1/2021 | |
| RU | 2751032 | C2 | 7/2021 | |
| WO | 2016026096 | A1 | 2/2016 | |
| WO | WO-2016120344 | A2 * | 8/2016 | A24B 15/167 |
| WO | 2016156495 | A2 | 10/2016 | |
| WO | 2017075759 | A1 | 5/2017 | |
| WO | WO-2018134159 | A1 * | 7/2018 | A24D 1/20 |
| WO | 2019201031 | A1 | 10/2019 | |
| WO | 2019234143 | A1 | 12/2019 | |
| WO | 2019238819 | A1 | 12/2019 | |
| WO | 2020044181 | A1 | 3/2020 | |
| WO | 2020048513 | A1 | 3/2020 | |
| WO | WO-2020119011 | A1 * | 6/2020 | A24B 15/10 |
| WO | 2020245012 | A1 | 12/2020 | |
| WO | 2020249493 | A1 | 12/2020 | |
| WO | 2020253640 | A1 | 12/2020 | |
| WO | 2021014388 | A1 | 1/2021 | |
| WO | 2021043690 | A1 | 3/2021 | |
| WO | 2021047423 | A1 | 3/2021 | |
| WO | 2021071201 | A1 | 4/2021 | |
| WO | 2021105462 | A1 | 6/2021 | |
| WO | 2021105473 | A1 | 6/2021 | |
| WO | 2021105479 | A1 | 6/2021 | |

OTHER PUBLICATIONS

Japanese Patent Office, Notice of Registration in Japanese Patent Application No. 2022-118499 (Nov. 14, 2023).

Japanese Patent Office, Notice of Registration in Japanese Patent Application No. 2022-118549 (Nov. 14, 2023).

Japanese Patent Office, Notice of Registration in Japanese Patent Application No. 2022-118490 (Dec. 26, 2023).

Russian Patent Office, Office Action in Russian Patent Application No. 2022120617 (Apr. 6, 2023).

Russian Patent Office, Office Action in Russian Patent Application No. 2022119623 (Dec. 8, 2022).

Japanese Patent Office, Office Action in Japanese Patent Application No. 2022-118458 (Jun. 13, 2023).

Japanese Patent Office, Notice of Registration in Japanese Patent Application No. 2022-118572 (Jun. 13, 2023).

Russian Patent Office, Notice of Registration in Russian Patent Application No. 2022120597 (Jun. 19, 2023).

Chinese Patent Office, First Office Action in Chinese Patent Application No. 202121741709.9 (Mar. 18, 2022).

Russian Patent Office, Office Action in Russian Patent Application No. 2022120597 (Jan. 12, 2023).

Japanese Patent Office, Office Action in Japanese Patent Application No. 2022-118549 (Jul. 4, 2023).

Japanese Patent Office, Office Action in Japanese Patent Application No. 2022-118499 (Jul. 4, 2023).

Japanese Patent Office, Office Action in Japanese Patent Application No. 2022-118490 (Jul. 4, 2023).

Japanese Patent Office, Office Action in Japanese Patent Application No. 2022-118524 (Aug. 8, 2023).

Japanese Patent Office, Office Action in Japanese Patent Application No. 2022-118474 (Aug. 8, 2023).

Japanese Patent Office, Notice of Registration in Japanese Patent Application No. 2022-115861 (Sep. 5, 2023).

(56) References Cited

OTHER PUBLICATIONS

Chinese Patent Office, Office Action in Chinese Patent Application No. 202110857412.7 (Aug. 20, 2024).
Chinese Patent Office, Office Action in Chinese Patent Application No. 202110859043.5 (Oct. 12, 2024).
Chinese Patent Office, Office Action in Chinese Patent Application No. 202110859047.3 (Oct. 11, 2024).
Chinese Patent Office, Office Action in Chinese Patent Application No. 202110857420.1 (Sep. 2, 2024).
Chinese Patent Office, Notification of grant of patent right for invention in Chinese Patent Application No. 202110859037.X (Jul. 19, 2024).
U.S. Patent and Trademark Office, Office Action in U.S. Appl. No. 17/815,344 (Sep. 20, 2024).
U.S. Patent and Trademark Office, Office Action in U.S. Appl. No. 17/814,316 (Sep. 9, 2024).
CN/202110859037.X, Notification of grant, Jul. 19, 2024.
CN/202110857412.7, Office Action, Aug. 20, 2024.
CN/202110857420.1, Office Action, Sep. 2, 2024.
CN/202110859043.5, Office Action, Oct. 12, 2024.
CN/202110859047.3, Office Action, Oct. 11, 2024.
CN/202110859047.3, Notification of grant, Nov. 29, 2024.
CN/202110857412.7, Notification of grant, Nov. 28, 2024.
CN/202110857437.7, Office Action, Oct. 17, 2024.
US/17814316, Office Action, Dec. 13, 2024.
CN/202110857437.7, Notification of grant, Dec. 26, 2024.
CN/202110857420.1, Notification of grant, Jan. 3, 2025.
CN/202110857429.2, Notification of grant, Dec. 26, 2024.
CN/202110857417.X, Notification of grant, Dec. 26, 2024.
Chinese Patent Office, Notification of grant of patent right for invention in Chinese Patent Application No. 202110859047.3 (Nov. 29, 2024).
Chinese Patent Office, Notification of grant of patent right for invention in Chinese Patent Application No. 202110857412.7 (Nov. 28, 2024).
Chinese Patent Office, Office Action in Chinese Patent Application No. 202110857437.7 (Oct. 17, 2024).
U.S. Patent and Trademark Office, Office Action in U.S. Appl. No. 17/814,316 (Dec. 13, 2024).
Chinese Patent Office, Notification of grant of patent right for invention in Chinese Patent Application No. 202110857437.7 (Dec. 26, 2024).
Chinese Patent Office, Notification of grant of patent right for invention in Chinese Patent Application No. 202110857420.1 (Jan. 3, 2025).
Chinese Patent Office, Notification of grant of patent right for invention in Chinese Patent Application No. 202110857429.2 (Dec. 26, 2024).
Chinese Patent Office, Notification of grant of patent right for invention in Chinese Patent Application No. 202110857417.X (Dec. 26, 2024).

* cited by examiner

AEROSOL-FORMING ARTICLE

CROSS-REFERENCE TO PRIOR APPLICATION

Priority is claimed to Chinese Patent Application No. CN 202110857437.7, filed on Jul. 28, 2021, the entire disclosure of which is hereby incorporated by reference herein.

FIELD

This application relates to the field of vaporization device technologies, and in particular, to an aerosol-forming article.

BACKGROUND

At present, a heating body of a heat-not-burn (HNB) product on the market is independent of the HNB product, and the heating body is inserted into the HNB product or wrapped outside the HNB product during use by a user, so that the heating body is in direct contact with the HNB product, and power is supplied to the heating body to generate heat to further bake the HNB product, to cause the HNB product to generate aerosols for inhalation. Because the HNB product is in direct contact with the heating body and the heating body needs to be reused, dirt generated by the HNB product during use is continuously accumulated on and adhered to the heating body, which is hard to clean, and a burnt flavor and odor may be generated after the dirt generated by the HNB product is heated repeatedly, affecting the taste consistency.

SUMMARY

In an embodiment, the present invention provides an aerosol-forming article, comprising: an aerosol-forming substrate; a heating layer encircling a concave portion, the aerosol-forming substrate being arranged in the concave portion; and a cover layer covering at least a part of the heating layer and an opening of the concave portion, wherein the aerosol-forming substrate is located between the heating layer and the cover layer, wherein a through hole is provided at a position of the cover layer corresponding to the opening, and wherein the heating layer is configured to generate eddy currents in a magnetic field to generate heat so as to heat the aerosol-forming substrate to form aerosols.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
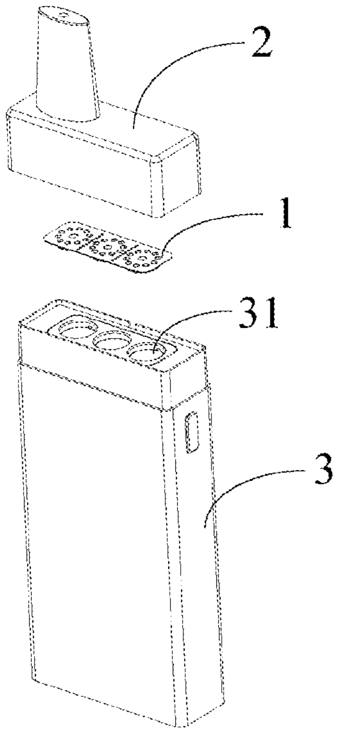
FIG. 1 is a schematic structural diagram of an aerosol-forming device according to this application.

In an embodiment, the present invention provides an aerosol-forming article, to resolve the problem that the dirt adhered to the heating body during repeated heating affects the taste in the related art.

In an embodiment, the present invention provides an aerosol-forming article, including: an aerosol-forming substrate; a heating layer, where the heating layer encircles a concave portion, and the aerosol-forming substrate is arranged in the concave portion; and a cover layer, covering at least a part of the heating layer and an opening of the concave portion, where the aerosol-forming substrate is located between the heating layer and the cover layer; a through hole is provided at a position of the cover layer corresponding to the opening; and the heating layer is configured to generate eddy currents in a magnetic field to generate heat, so that the aerosol-forming substrate is heated to form aerosols.

The concave portion includes an annular side wall and a bottom wall, and an outer side of the annular side wall includes a hanger loop. The heating layer encircles a plurality of concave portions, annular side walls of adjacent concave portions are spaced, and adjacent concave portions share a same hanger loop.

The heating layer is provided with a first partition hole on the hanger loop shared by the adjacent concave portions.

A second partition hole is provided on the cover layer, and the second partition hole and the first partition hole are correspondingly provided.

Each heating layer encircles one concave portion, adjacent concave portions are spaced, and hanger loops of adjacent concave portions are spaced.

The aerosol-forming substrate gathers to form a layered body, a bottom wall of the concave portion is attached to a bottom surface of the aerosol-forming substrate, and a distance between a side wall of the concave portion and a side surface of the aerosol-forming substrate ranges from 0.1 mm to 1.0 mm.

A thickness of the aerosol-forming substrate ranges from 0.5 mm to 3 mm, and a depth of the concave portion ranges from 0.5 mm to 3 mm.

A shape of a cross-section of the aerosol-forming substrate is a circle, and a diameter of the aerosol-forming substrate ranges from 3.0 mm to 20 mm.

A thickness of the heating layer ranges from 0.05 mm to 0.3 mm. The heating layer is made of an aluminum foil.

A thickness of the cover layer ranges from 0.02 mm to 0.1 mm; and the cover layer is made of an aluminum foil. Beneficial effects of this application are as follows: different from the related art, an aerosol-forming article is provided, the aerosol-forming article includes: an aerosol-forming substrate; a heating layer, where the heating layer encircles a concave portion, and the aerosol-forming substrate is arranged in the concave portion; and a cover layer, covering at least a part of the heating layer and an opening of the concave portion, where the aerosol-forming substrate is located between the heating layer and the cover layer; a through hole is provided at a position of the cover layer corresponding to the opening; and the heating layer is configured to generate eddy currents in a magnetic field to generate heat, so that the aerosol-forming substrate is heated to form aerosols. According to the aerosol-forming article provided in this application, eddy currents are generated in a magnetic current to generate heat, and the aerosol-forming substrate is further heated, thereby preventing occurrence of a burnt flavor or odor caused by heating of a heating layer that is reused and improving the taste of aerosols.

This application is further described in detail below with reference to the accompanying drawings and embodiments. It should be specifically noted that, the following embodiments are merely used for describing this application rather than limiting the scope of this application. Similarly, the following embodiments are merely some rather than all of the embodiments of this application, and all other embodiments obtained by a person of ordinary skill in the art without creative efforts shall fall within the protection scope of this application.

The terms "first", "second", and "third" in this application are merely intended for a purpose of description, and shall not be understood as indicating or implying relative significance or implicitly indicating the number of indicated technical features. Therefore, features defining "first", "second", and "third" can explicitly or implicitly include at least one of the features. In the description of this application, "a plurality of" means at least two, such as two and three unless it is specifically defined otherwise. All directional indications (for example, upper, lower, left, right, front, and rear) in the embodiments of this application are merely used for explaining relative position relationships, movement situations, or the like between the various components in a specific posture (as shown in the accompanying drawings). If the specific posture changes, the directional indications change accordingly. In the embodiments of this application, the terms "include", "have", and any variant thereof are intended to cover a non-exclusive inclusion. For example, a process, method, system, product, or device that includes a series of steps or units is not limited to the listed steps or units, but further optionally includes a step or unit that is not listed, or further optionally includes another step or component that is intrinsic to the process, method, product, or device.

"Embodiment" mentioned in this specification means that particular features, structures, or characteristics described with reference to the embodiment may be included in at least one embodiment of this application. The term appearing at different positions of this specification may not refer to the same embodiment or an independent or alternative embodiment that is mutually exclusive with another embodiment. A person skilled in the art explicitly or implicitly understands that the embodiments described in this specification may be combined with other embodiments.

Referring to FIG. 1, FIG. 1 is a schematic structural diagram of an aerosol-forming device according to this application. The aerosol-forming device includes an aerosol-forming article 1, an air communication component 2, and a vaporization main unit 3. The vaporization main unit 3 includes a heating element 31, the heating element 31 is arranged on an end portion of the vaporization main unit 3 close to the air communication component 2, and the aerosol-forming article 1 is arranged on an end of the vaporization main unit 3 close to the air communication component 2. Namely, the aerosol-forming article 1 is arranged between the air communication component 2 and the vaporization main unit 3, and the aerosol-forming article 1 is in contact with the heating element 31.

The aerosol-forming article 1 is fixed through connection and fixing between the air communication component 2 and the vaporization main unit 3.

Specifically, the air communication component 2 and the vaporization main unit 3 may be fixed and connected through magnetic attraction. Namely, magnetic members are respectively arranged on the air communication component 2 and the vaporization main unit 3 to implement a magnetic attraction connection, or a magnet is arranged on one of the air communication component 2 and the vaporization main unit 3, and a metal member is correspondingly arranged on the other to implement a magnetic attraction connection. The air communication component 2 and the vaporization main unit 3 may be fixed and connected through buckles. Namely, a protrusion is provided on the air communication component 2, and a slot is correspondingly provided on the vaporization main unit 3 to implement a buckle connection, or a protrusion is provided on the vaporization main unit 3, and a slot is correspondingly provided on the air communication component 2 to implement a buckle connection. A connection manner between the air communication component 2 and the vaporization main unit 3 is designed as required, which is not limited in this application.

Figure 2:
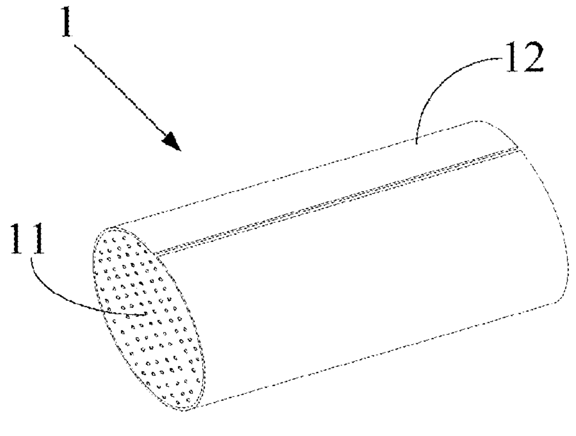
FIG. 2 is a schematic structural diagram of a first embodiment of an aerosol-forming article according to this application.

Referring to FIG. 2, FIG. 2 is a schematic structural diagram of a first embodiment of an aerosol-forming article according to this application.

The aerosol-forming article 1 includes an aerosol-forming substrate 11 and an encapsulation layer 12. The encapsulation layer 12 covers at least a part of the aerosol-forming substrate 11, so that the encapsulation layer 12 isolates the aerosol-forming substrate 11 from the heating element 31. The aerosol-forming article 1 is a replaceable and disposable product. An area of the aerosol-forming substrate 11 covered by the encapsulation layer 12 is selected according to a specific implementation, provided that the encapsulation layer 12 can isolate the aerosol-forming substrate 11 from the heating element 31, namely, provided that the aerosol-forming substrate 11 and the heating element 31 cannot be in direct contact due to the area of the aerosol-forming substrate 11 covered by the encapsulation layer 12.

The heating element 31 is configured to heat the encapsulation layer 12, and the encapsulation layer 12 conducts heat to the aerosol-forming substrate 11 in the aerosol-forming article 1 to form aerosols, namely, the aerosol-forming article 1 is heated in a resistive manner. Alternatively, the heating element 31 is an electromagnetic member such as an electromagnetic coil, and the encapsulation layer 12 generates eddy currents in a magnetic field of the electromagnetic member to generate heat, to heat the aerosol-forming substrate 11 to form aerosols, namely, the aerosol-forming article 1 is heated in an electromagnetic manner. When the aerosol-forming article 1 is heated in an electromagnetic manner, the encapsulation layer 12 is a heating layer, and the heating layer generates eddy currents in the magnetic field of the heating element 31 (electromagnetic member) to generate heat, to heat the aerosol-forming substrate 11 to form aerosols.

When the aerosol-forming article 1 is heated in a resistive manner, the encapsulation layer 12 has a characteristic of uniform heat conduction and may be made of glasses, ceramics, or metals, provided that the requirement is met. Namely, the encapsulation layer 12 may be a metal layer, a ceramic layer, or a glass layer. It may be understood that, the aerosol-forming substrate 11 can be heated uniformly due to the uniform heat conduction characteristic of the encapsulation layer 12, thereby helping improve the quality consistency, namely, taste consistency of the aerosols. When the aerosol-forming article 1 is heated in an electromagnetic manner, the encapsulation layer 12 is made of a metal such as an aluminum foil that can generate heat in a magnetic field.

The aerosol-forming article 1 is set to include the aerosol-forming substrate 11 and the encapsulation layer 12, and the encapsulation layer 12 covers at least a part of the aerosol-forming substrate 11, so that the encapsulation layer 12 isolates the aerosol-forming substrate 11 from the heating element 31. Therefore, the heating element 31 is prevented from being in direct contact with the aerosol-forming substrate 11, namely, aerosol residues are prevented from being adhered to the heating element 31 when the heating element 31 heats the aerosol-forming substrate 11 to generate aerosols, and a problem that the aerosol residues adhered to the heating element 31 are hard to clean is further prevented. No impact is caused on the taste of the aerosols even if the heating element 31 is reused, thereby improving the use experience of users. In addition, the encapsulation layer 12 covers at least a part of the aerosol-forming substrate 11, after the aerosol-forming substrate 11 is consumed, the encapsulation layer 12 and the aerosol-forming substrate 11 are discarded together, and a new aerosol-forming article 1 is replaced, so that replacement of the aerosol-forming substrate 11 is more convenient, faster, and cleaner.

During a specific implementation, the aerosol-forming substrate 11 may be in a shape of power, filamentous, or may form a block through gathering. When the aerosol-forming substrate 11 is in a shape of power or filamentous, a form of the aerosol-forming substrate cannot be fixed. In this case, a mold is required to lay the encapsulation layer 12 in the mold, and the mold is then filled by the aerosol-forming substrate 11, to further obtain the aerosol-forming article 1 in a predetermined shape. When the aerosol-forming substrate 11 is a block, it is more convenient to assemble the aerosol-forming substrate 11 and the encapsulation layer 12 to form the aerosol-forming article 1. In addition, the aerosol-forming substrate 11 may be designed into a columnar body, a layered body, or another shape as required, and a required shape of the aerosol-forming article 1 is further obtained. The aerosol-forming substrate 11 is described as a block in the following description.

It may be understood that, at least a part of the encapsulation layer 12 covering the aerosol-forming substrate 11 is to isolate the aerosol-forming substrate 11 from the heating element 31, to ensure relatively high heating efficiency, and the part of encapsulation layer 12 is attached to the aerosol-forming substrate 11.

In a first embodiment of the aerosol-forming article 1, the aerosol-forming substrate 11 gathers to form a columnar body, and the encapsulation layer 12 is set to be in a shape of a hollow column and covers a side surface of the aerosol-forming substrate 11.

For example, the encapsulation layer 12 may be in a shape of a sheet to form the hollow column through wrapping; or the encapsulation layer 12 may be in a shape of a belt to form the hollow column through spirally wrapping. In this embodiment, the aerosol-forming article 1 may be heated in a resistive manner or may be heated in an electromagnetic manner, which is specifically selected as required. It may be understood that, the side surface of the aerosol-forming substrate 11 in this embodiment is a heating surface, and a bottom surface thereof is an aerosol releasing surface.

For example, the columnar body formed by the aerosol-forming substrate 11 through gathering may be a cylinder, a triangular prism, or a quadrangular prism, and a structure size of the encapsulation layer 12 and a structure size of the aerosol-forming substrate 11 are arranged in an engagement manner, provided that the encapsulation layer 12 completely covers the side surface of the aerosol-forming substrate 11.

To ensure relatively high heating efficiency, the encapsulation layer 12 is attached to the side surface of the aerosol-forming substrate 11.

When the aerosol-forming article 1 is heated in an electromagnetic manner, the heating element 31 is an electromagnetic member, the encapsulation layer 12 is a heating layer, and the heating layer generates eddy currents in the magnetic field of the electromagnetic member to generate heat, to heat the aerosol-forming substrate 11 to form aerosols. The heating layer encircles a columnar structure and forms a non-closed loop, and the aerosol-forming substrate 11 is arranged in the columnar structure. Specifically, the heating layer is arranged in a curled manner and encircles an accommodating space, and the accommodating space is configured to accommodate the aerosol-forming substrate 11. The heating layer includes a first end and a second end opposite to the first end, where the first end and the second end are provided opposite to each other. A surface of the heating layer that is in contact with the aerosol-forming substrate 11 is an inner wall surface of the accommodating space, and a surface of the heating layer that is not in contact with the aerosol-forming substrate 11 is an outer wall surface of the accommodating space. The first end and the second end of the heating layer are both spaced apart from the inner wall surface and the outer wall surface of the accommodating space.

In an implementation, the aerosol-forming substrate 11 gathers to form a columnar body, the heating layer surrounds the side surface of the aerosol-forming substrate 11 and encircles a hollow tubular body, and a notch is provided on a side wall of the hollow tubular body, so that the heating layer forms a non-closed loop. That is, the first end and the second end of the heating layer are provided opposite to each other and are spaced apart from each other. Two opposite ends of the hollow tubular body are both opening ends, and the heating layer covers the side surface of the aerosol-forming substrate 11, where the structure is shown in FIG. 2. The notch extends from one end of the hollow tubular body to the other end in an axial direction of the hollow tubular body.

In another implementation, the heating layer is in a shape of a rectangular sheet, the heating layer is arranged in a curled manner surrounding one side thereof to form a hollow columnar body, and there is a gap between two opposite sides of the heating layer, so that the heating layer forms a non-closed loop, where the structure is shown in FIG. 2. It may be understood that, a shape of a cross-section of the aerosol-forming substrate 11 may be a circle or a triangle. When the shape of the cross-section of the aerosol-forming substrate 11 is a circle, a diameter of the aerosol-forming substrate 11 ranges from 3.0 mm to 20 mm. The heating layer is made of an aluminum foil or a copper foil, and a thickness of the heating layer ranges from 0.05 mm to 0.3 mm.

When the aerosol-forming article 1 is heated in a resistive manner, the encapsulation layer 12 in the structure of FIG. 2 may form a closed loop or a non-closed loop, which is specifically designed as required.

Figure 3:
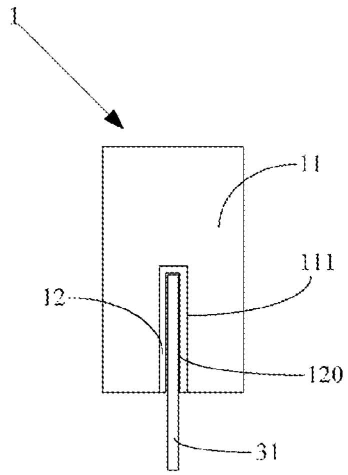
FIG. 3 is a schematic structural diagram of a second embodiment of an aerosol-forming article according to this application.

Referring to FIG. 3, FIG. 3 is a schematic structural diagram of a second embodiment of an aerosol-forming article according to this application.

In the second embodiment of the aerosol-forming article 1, the aerosol-forming substrate 11 gathers to form a columnar body. For example, the aerosol-forming substrate 11 may be in a shape of a cylinder, a triangular prism, or a quadrangular prism. An insertion groove 111 is provided on the aerosol-forming substrate 11, the encapsulation layer 12 is arranged in the insertion groove 111 and covers an inner wall of the insertion groove 111, and the heating element 31 is inserted into a cavity 120 encircled by the encapsulation layer 12. In this embodiment, the aerosol-forming article 1 is heated in a resistive manner. It may be understood that, in this embodiment, an inner wall surface of the insertion groove 111 of the aerosol-forming substrate 11 is a heating surface, and an outer surface of the aerosol-forming substrate 11 may be used as an aerosol releasing surface, which are specifically designed as required. In an implementation, the encapsulation layer 12 may alternatively be folded into a multi-layer structure and then inserted into the aerosol-forming substrate 11. During use, the sheet-like heating element 31 is inserted into layers of the encapsulation layer 12, thereby preventing the heating element 31 from being in contact with the aerosol-forming substrate 11.

Figure 4:
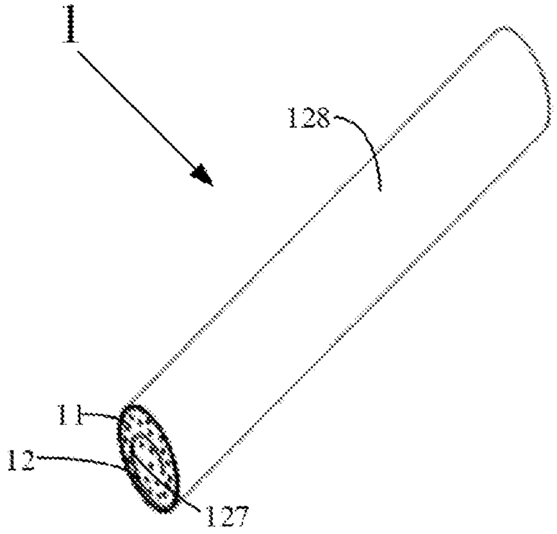
FIG. 4 is a schematic structural diagram of a third embodiment of an aerosol-forming article according to this application.

Referring to FIG. 4, FIG. 4 is a schematic structural diagram of a third embodiment of an aerosol-forming article according to this application.

In the third embodiment of the aerosol-forming article 1, the aerosol-forming substrate 11 gathers to form a layered body, and the encapsulation layer 12 and the aerosol-forming substrate 11 are stacked and are curled together into a shape of a column or a shape similar to a column, such as a shape of a spring roll, so that the outer surface of the aerosol-forming substrate 11 is wrapped by the encapsulation layer 12, and the encapsulation layer 12 is also arranged inside the aerosol-forming substrate. That is, the encapsulation layer 12 includes a first end and a second end, where the second end is curled surrounding the first end to form a shape of a roll, and the aerosol-forming substrate 11 is filled in a gap of the rolled encapsulation layer 12. For example, a cross-section of the layered aerosol-forming substrate 11 may be a square or a rectangle, and the column formed by the aerosol-forming substrate 11 and the encapsulation layer 12 through curling may be a cylinder, a triangular prism, or a quadrangular prism. In this embodiment, the aerosol-forming article 1 may be heated in a resistive manner or may be heated in an electromagnetic manner, which is specifically selected as required.

It may be understood that, a side surface of the column formed by the aerosol-forming substrate 11 and the encapsulation layer 12 through curling is a heating surface, and a bottom surface thereof is an aerosol releasing surface. A structure size of the encapsulation layer 12 and a structure size of the layered aerosol-forming substrate 11 are arranged in an engagement manner, so that the encapsulation layer 12 and the aerosol-forming substrate 11 are curled together, and the encapsulation layer 12 isolates the aerosol-forming substrate 11 from the heating element 31.

When the aerosol-forming article 1 is heated in an electromagnetic manner, the heating element 31 is an electromagnetic member, the encapsulation layer 12 is a heating layer, and the heating layer generates eddy currents in the magnetic field of the electromagnetic member to generate heat, to heat the aerosol-forming substrate 11 to form aerosols. The heating layer encircles a columnar structure and forms a non-closed loop, and the aerosol-forming substrate 11 is arranged in the columnar structure. Specifically, the aerosol-forming substrate 11 gathers to form a columnar body, the heating layer is in a shape of a rectangular sheet, one side of the heating layer is located on a side surface of the aerosol-forming substrate 11, the heating layer is curled, and another side of the heating layer is located inside the aerosol-forming substrate 11, to form a non-closed loop (as shown in FIG. 4). That is, the aerosol-forming substrate 11 covers on the heating layer, the second end of the heating layer is arranged surrounding the first end thereof, the first end of the heating layer is curled and located inside the aerosol-forming substrate 11, and the second end of the heating layer is located on an outer side of the aerosol-forming substrate 11. The inner wall surface of the accommodating space is a first surface 127 of the heating layer, and a part of the heating layer curled to the inside of the aerosol-forming substrate 11 is a second surface 128. The outer wall surface of the accommodating space is a part of the heating layer that is not curled to the inside of the aerosol-forming substrate 11 and is not in contact with the aerosol-forming substrate 11. The first end of the heating layer and the inner wall surface of the accommodating space are spaced, and the second end of the heating layer and the outer wall surface of the accommodating space are spaced.

Figure 5:
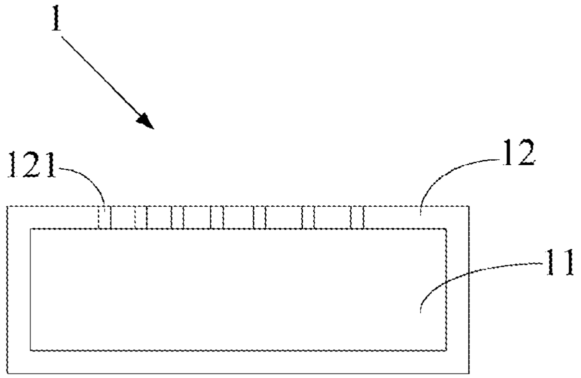
FIG. 5 is a schematic structural diagram of a fourth embodiment of an aerosol-forming article according to this application.

Referring to FIG. 5, FIG. 5 is a schematic structural diagram of a fourth embodiment of an aerosol-forming article according to this application.

In the fourth embodiment of the aerosol-forming article 1, the aerosol-forming substrate 11 gathers to form a layered body, and the encapsulation layer 12 covers the whole outer surface of the aerosol-forming substrate 11. In addition, a first through hole 121 is provided on the encapsulation layer 12 on one side of the aerosol-forming substrate 11 away from the heating element 31, to release aerosols. In this embodiment, the aerosol-forming article 1 may be heated in a resistive manner or may be heated in an electromagnetic manner, which is specifically selected as required.

For example, a cross-section of the layered aerosol-forming substrate 11 may be a circle, a square, or a rectangle, which is specifically designed as required. It may be understood that, in this embodiment, because the encapsulation layer 12 covers the whole outer surface of the aerosol-forming substrate 11, surfaces of the aerosol-forming substrate 11 in contact with the encapsulation layer 12 are all heating surfaces, and a surface of the aerosol-forming substrate 11 corresponding to the first through hole 121 provided on the encapsulation layer 12 is an aerosol releasing surface.

Figure 6:
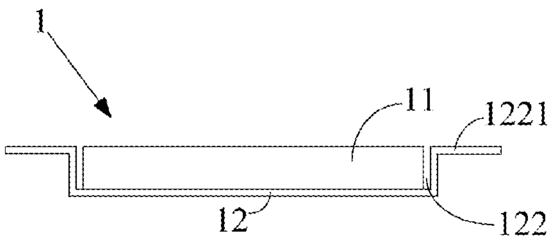
FIG. 6 is a schematic structural diagram of a fifth embodiment of an aerosol-forming article according to this application.
Figure 7:
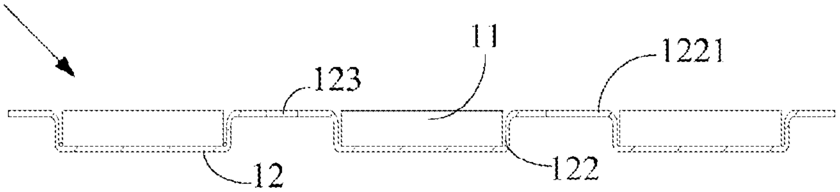
FIG. 7 is another schematic structural diagram of a fifth embodiment of an aerosol-forming article according to this application.

Referring to FIG. 6 and FIG. 7, FIG. 6 is a schematic structural diagram of a fifth embodiment of an aerosol-forming article according to this application, and FIG. 7 is another schematic structural diagram of a fifth embodiment of an aerosol-forming article according to this application.

In the fifth embodiment of the aerosol-forming article 1, the aerosol-forming substrate 11 gathers to form a layered body. For example, a cross-section of the layered aerosol-forming substrate 11 may be a circle, a square, or a rectangle, which is specifically designed as required. The encapsulation layer 12 covers a surface of one side of the aerosol-forming substrate 11 close to the heating element 31, to isolate the aerosol-forming substrate 11 from the heating element 31. That is, the encapsulation layer 12 encircles a concave portion 122, and the aerosol-forming substrate 11 is arranged in the concave portion 122. The concave portion 122 includes an annular side wall and a bottom wall, and an outer side of the annular side wall includes a hanger loop 1221, so that the aerosol-forming article 1 is connected onto the vaporization main unit 3.

It may be understood that, in this embodiment, a surface of the aerosol-forming substrate 11 in contact with the encapsulation layer 12 is a heating surface, and surfaces other than the surface in contact with the encapsulation layer 12 on the aerosol-forming substrate 11 are all aerosol releasing surfaces, which are specifically designed as required. Namely, the bottom surface of the aerosol-forming substrate 11 is attached to the bottom wall of the concave portion 122, and the side surface of the aerosol-forming substrate 11 may be in contact or not in contact with the annular side wall of the concave portion 122, which is specifically designed as required. In this embodiment, the aerosol-forming article 1 may be heated in a resistive manner or may be heated in an electromagnetic manner, which is specifically selected as required.

In an implementation, a plurality of aerosol-forming articles 1 are independent of each other. As shown in FIG. 6, encapsulation layers 12 of the plurality of aerosol-forming articles 1 are independent of each other. Specifically, each encapsulation layer 12 encircles one concave portion 122, the plurality of encapsulation layers 12 encircle a plurality of concave portions 122, the aerosol-forming substrate 11 is arranged in each concave portion 122, and adjacent concave portions 122 are spaced. For ease of assembling the aerosol-forming article 1 into an aerosol-forming device, in addition to covering the surface of the side of the aerosol-forming substrate 11 close to the heating element 31, the encapsulation layer 12 of the aerosol-forming article 1 further bends toward the side surface of the aerosol-forming substrate 11 to form the hanger loop 1221, so that the aerosol-forming article 1 is connected onto the vaporization main unit 3. In this implementation, hanger loops 1221 of adjacent concave portions 122 are spaced. That is, the encapsulation layer 12 bends to form the concave portion 122, and the aerosol-forming substrate 11 is arranged in the concave portion 122. A distance between the annular side wall of the concave portion 122 and the side surface of the aerosol-forming substrate 11 ranges from 0.1 mm to 1.0 mm, to better release aerosols. Optionally, the distance between the annular side wall of the concave portion 122 and the side surface of the aerosol-forming substrate 11 ranges from 0.2 mm to 0.3 mm. The bottom surface of the aerosol-forming substrate 11 is attached to the bottom wall of the concave portion 122, to improve the heating efficiency.

In another implementation, for ease of assembling a plurality of aerosol-forming articles 1 into an aerosol-forming device, the plurality of aerosol-forming articles 1 are set to be an integral structure. Namely, encapsulation layers 12 of the plurality of aerosol-forming articles 1 are a whole layer structure, and as shown in FIG. 7, the plurality of aerosol-forming articles 1 form an integral structure through the encapsulation layer 12. Specifically, there are a plurality of concave portions 122 encircled by the encapsulation layer 12. Namely, the encapsulation layer 12 bends to form a plurality of spaced concave portions 122, and the aerosol-forming substrate 11 is arranged in each of the plurality of concave portions 122. Annular side walls of adjacent concave portions 122 are spaced, so that adjacent aerosol-forming substrates 11 are independent of each other. Therefore, the adjacent aerosol-forming substrates 11 can be heated independently, and the adjacent aerosol-forming substrates 11 do not affect each other during heating. Hanger loops 1221 of adjacent concave portions 122 include a common part. Further, to improve the heating efficiency, a first partition hole 123 is provided on a hanger loop 1221 serving as the common part between adjacent concave portions 122 on the encapsulation layer 12, and heat conduction between the adjacent concave portions 122 is reduced through air heat insulation, so that mutual impact between the adjacent aerosol-forming substrates 11 during heating is reduced to the maximum extent. A distance between the annular side wall of the concave portion 122 and the side surface of the aerosol-forming substrate 11 ranges from 0.1 mm to 1.0 mm, to better release aerosols. Optionally, the distance between the annular side wall of the concave portion 122 and the side surface of the aerosol-forming substrate 11 ranges from 0.2 mm to 0.3 mm. The bottom surface of the aerosol-forming substrate 11 is attached to the bottom wall of the concave portion 122, to improve the heating efficiency.

Figure 8:
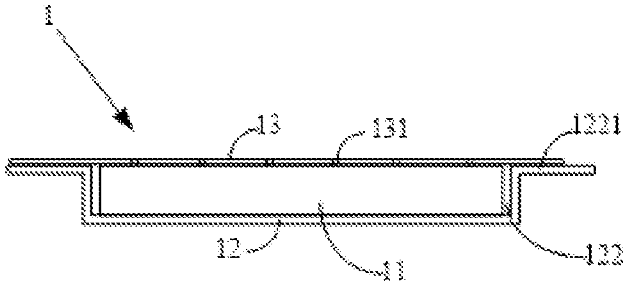
FIG. 8 is a schematic structural diagram of a sixth embodiment of an aerosol-forming article according to this application.
Figure 9:
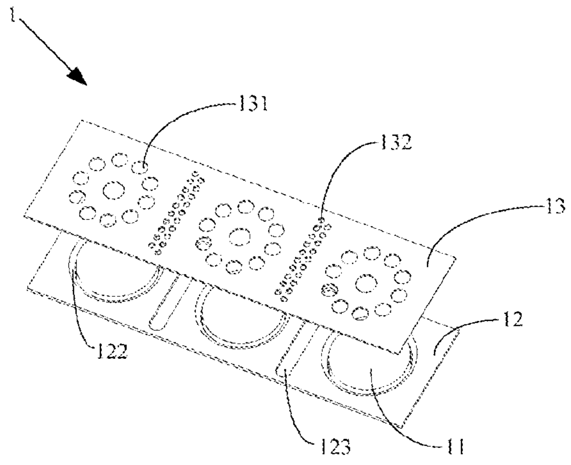
FIG. 9 is another schematic structural diagram of a sixth embodiment of an aerosol-forming article according to this application.

Referring to FIG. 8 and FIG. 9, FIG. 8 is a schematic structural diagram of a sixth embodiment of an aerosol-forming article according to this application, and FIG. 9 is another schematic structural diagram of a sixth embodiment of an aerosol-forming article according to this application.

In the sixth embodiment of the aerosol-forming article 1, the structure of the aerosol-forming article 1 is basically the same as that in the fifth embodiment, and a difference lies in that the aerosol-forming article further includes a cover layer 13.

In the sixth embodiment of the aerosol-forming article 1, the aerosol-forming substrate 11 gathers to form a layered body. For example, a cross-section of the layered aerosol-forming substrate 11 may be a circle, a square, or a rectangle, which is specifically designed as required. The encapsulation layer 12 covers a surface of one side of the aerosol-forming substrate 11 close to the heating element 31, to isolate the aerosol-forming substrate 11 from the heating element 31. That is, the encapsulation layer 12 encircles a concave portion 122, and the aerosol-forming substrate 11 is arranged in the concave portion 122. The concave portion 122 includes an annular side wall and a bottom wall, and an outer side of the annular side wall includes a hanger loop 1221, so that the aerosol-forming article 1 is connected onto the vaporization main unit 3. The cover layer 13 covers at least a part of the encapsulation layer 12 and an opening of the concave portion 122, and the aerosol-forming substrate 11 is arranged between the encapsulation layer 12 and the cover layer 13. A second through hole 131 is provided at a position of the cover layer 13 corresponding to the opening of the concave portion 122, and the second through hole 131 is configured to release aerosols. Namely, the cover layer 13 is arranged on a surface of the encapsulation layer 12 and covers the concave portion 122, and the second through hole 131 is provided at a position of the cover layer 13 corresponding to the concave portion 122. A main function of the cover layer 13 is to fix the aerosol-forming substrate 11 in the concave portion 122, and the cover layer 13 is fixed on the encapsulation layer 12 in a riveting or wrapping manner or using high temperature resistant glue. The cover layer 13 is made of a metal material. Optionally, the material of the cover layer 13 is an aluminum foil. A thickness of the cover layer ranges from 0.02 mm to 0.1 mm. Optionally, the thickness of the cover layer ranges from 0.02 mm to 0.05 mm.

It may be understood that, in this embodiment, a surface of the aerosol-forming substrate 11 in contact with the encapsulation layer 12 is a heating surface, and all surfaces other than the surface in contact with the encapsulation layer 12 on the aerosol-forming substrate 11 are aerosol releasing surfaces, which are specifically designed as required. Namely, the bottom surface of the aerosol-forming substrate 11 is attached to the bottom wall of the concave portion 122, and the side surface of the aerosol-forming substrate 11 may be in contact or not in contact with the annular side wall of the concave portion 122, which is specifically designed as required. In this embodiment, the aerosol-forming article 1 may be heated in a resistive manner or may be heated in an electromagnetic manner, which is specifically selected as required.

In an implementation, a plurality of aerosol-forming articles 1 are independent of each other. Namely, encapsulation layers 12 of the plurality of aerosol-forming articles 1 are independent of each other, and cover layers 13 of the plurality of aerosol-forming articles 1 are independent of each other. As shown in FIG. 8, one encapsulation layer 12 encircles one concave portion 122, and one cover layer 13 covers one concave portion 122. Specifically, an arrangement manner of the encapsulation layer 12 is the same as the arrangement manner of the encapsulation layer 12 in the aerosol-forming article 1 provided in FIG. 6, and an engagement relationship between the encapsulation layer 12 and the aerosol-forming substrate 11 is the same as the engagement relationship between the encapsulation layer 12 and the aerosol-forming substrate 11 in the aerosol-forming article 1 provided in FIG. 6, which are not described in detail herein.

In another implementation, for ease of assembling a plurality of aerosol-forming articles 1 into an aerosol-forming device, the plurality of aerosol-forming articles 1 are set to be an integral structure. Namely, encapsulation layers 12 of the plurality of aerosol-forming articles 1 are a whole layer structure, cover layers 13 of the plurality of aerosol-forming articles 1 are a whole layer structure, and as shown in FIG. 9, the plurality of aerosol-forming articles 1 form an integral structure through the encapsulation layer 12 and the cover layers 13. Specifically, an arrangement manner of the encapsulation layer 12 is the same as the arrangement manner of the encapsulation layer 12 in the aerosol-forming article 1 provided in FIG. 7, and an engagement relationship between the encapsulation layer 12 and the aerosol-forming substrate 11 is the same as the engagement relationship between the encapsulation layer 12 and the aerosol-forming substrate 11 in the aerosol-forming article 1 provided in FIG. 6, which are not described in detail herein. Different from the aerosol-forming article 1 provided in FIG. 7, in the aerosol-forming article 1 provided in FIG. 9, the cover layer 13 covers the plurality of concave portions 122, and a second through hole 131 is provided at a position of the cover layer 13 corresponding to the concave portion 122 to release aerosols. A second partition hole 132 is provided on the cover layer 13 corresponding to the first partition hole 123, and heat conduction between adjacent concave portions 122 is reduced through air heat insulation, so that mutual impact between adjacent aerosol-forming substrates 11 during heating is reduced to the maximum extent.

In the first embodiment, the second embodiment, the third embodiment, the fourth embodiment, the fifth embodiment, and the sixth embodiment of the aerosol-forming article 1, the encapsulation layer 12 is made of a metal material. Optionally, the material of the encapsulation layer 12 is a copper foil or an aluminum foil. To achieve relatively high heating efficiency, the thickness of the encapsulation layer 12 is set to range from 0.05 mm to 0.3 mm. Optionally, the thickness of the encapsulation layer 12 ranges from 0.1 mm to 0.15 mm.

In the first embodiment and the second embodiment of the aerosol-forming article 1, a farthest distance between two points on the cross-section of the columnar aerosol-forming substrate 11 ranges from 0.5 mm to 3 mm, so that the aerosol-forming substrate 11 can be better heated, and the aerosol-forming substrate 11 can be prevented from being locally heated for a long time. In the third embodiment, the fourth embodiment, the fifth embodiment, and the sixth embodiment of the aerosol-forming article 1, the thickness of the sheet-like aerosol-forming substrate 11 is set to range from 0.5 mm to 3 mm. A thinner thickness indicates that the surface of the aerosol-forming substrate 11 away from the encapsulation layer 12 can be better heated and a shorter time that the aerosol-forming substrate 11 is heated and consumed. Therefore, the aerosol-forming substrate 11 can be prevented from being locally heated for a long time, and occurrence of a burnt flavor can be further prevented from affecting the taste. Optionally, the thickness of the aerosol-forming substrate 11 ranges from 1.0 mm to 2.0 mm.

In the fourth embodiment, the fifth embodiment, and the sixth embodiment of the aerosol-forming article 1, the shape of the cross-section of the sheet-like aerosol-forming substrate 11 is a circle, and the diameter of the aerosol-forming substrate 11 is set to range from 3.0 mm to 20 mm. Optionally, the diameter of the aerosol-forming substrate 11 ranges from 8.0 mm to 12.0 mm.

The aerosol-forming article 1 adopts the structure in the sixth embodiment shown in FIG. 9 in the following description.

Figure 10:
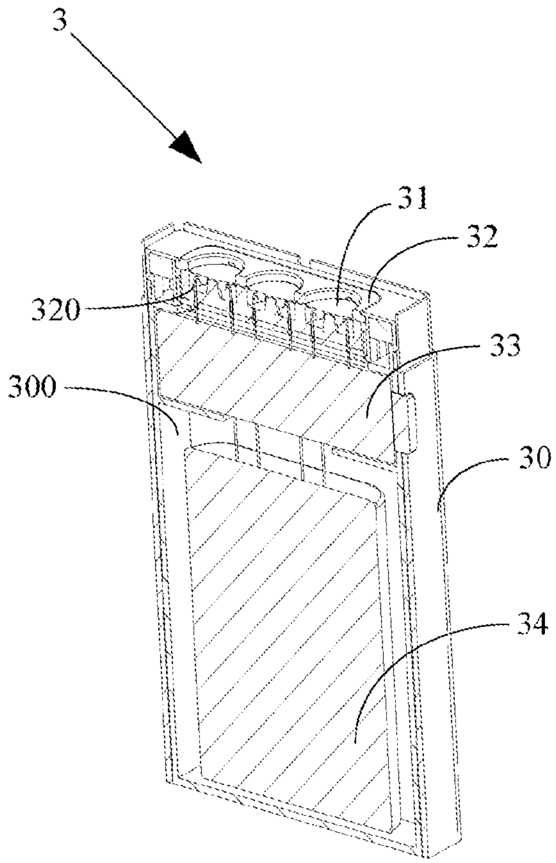
FIG. 10 is a schematic structural diagram of a vaporization main unit according to this application.

Referring to FIG. 10, FIG. 10 is a schematic structural diagram of a vaporization main unit according to this application.

The vaporization main unit 3 further includes a housing 30, a mounting base 32, a controller 33, and a power supply 34. The housing 30 includes a mounting space 300. The mounting base 32 is arranged in the mounting space 300 and is exposed from one end of the housing 30, to engage with an air communication component 2 to form a vaporization cavity 24 (referring to FIG. 25). The mounting base 32 is provided with at least one mounting portion 320, the mounting portion 320 is configured to mount an aerosol-forming article 1, and a heating element 31 is arranged corresponding to the mounting portion 320 and configured to heat the aerosol-forming article 1. The controller 33 and the power supply 34 are arranged in the mounting space 300 and are located on one side of the mounting base 32 away from the air communication component 2, and the controller 33 controls the power supply 34 to supply power to the heating element 31. It may be understood that, one or more aerosol-forming articles 1 may be arranged in the mounting portion 320. Alternatively, one aerosol-forming article 1 may be arranged in one mounting portion 320, namely, the number of mounting portions 320 and the number of heating elements 31 are the same as the number of aerosol-forming articles 1, which is specifically designed as required. The following description is provided by using an example in which one aerosol-forming article 1 is arranged in one mounting portion 320.

Figure 11:
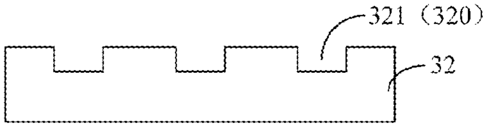
FIG. 11 is a schematic structural diagram of a mounting base in a vaporization main unit according to this application.
Figure 12:
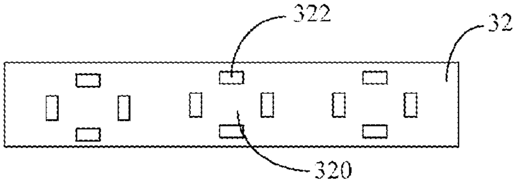
FIG. 12 is another schematic structural diagram of a mounting base in a vaporization main unit according to this application.

Referring to FIG. 11 and FIG. 12, FIG. 11 is a schematic structural diagram of a mounting base in a vaporization main unit according to this application, and FIG. 12 is another schematic structural diagram of a mounting base in a vaporization main unit according to this application. During a specific implementation, that at least one mounting portion 320 is formed on the mounting base 32 may be that at least one groove 321 is formed on the mounting base 32. One groove 321 is used as one mounting portion 320, and an internal space formed by the groove 321 is a mounting position of the aerosol-forming article 1 (as shown in FIG. 11). Namely, the groove 321 is used as the mounting portion 320 and configured to accommodate the aerosol-forming article 1. Alternatively, a plurality of protrusions 322 may be provided on the mounting base 32, a space encircled by the plurality of protrusions 322 is the mounting position of the aerosol-forming article 1, and the space encircled by the plurality of protrusions 322 is used as one mounting portion 320 (as shown in FIG. 12). The arrangement manner of the mounting portion 320 may be designed as required, provided that the aerosol-forming article 1 can be fixed.

To improve the heating efficiency, there is a gap between a side surface of the aerosol-forming article 1 and an inner side surface of the mounting portion 320 to implement air heat insulation, and the heating element 31 and the inner side surface of the mounting portion 320 are at least partially spaced to implement air heat insulation between the heating element 31 and an inner wall surface of the groove 321, so that heat of the heating element 31 for heating the aerosol-forming article 1 is mostly absorbed by the aerosol-forming article 1, and only a few of the heat is conducted to the mounting base 32, thereby reducing a heat loss.

Figure 13:
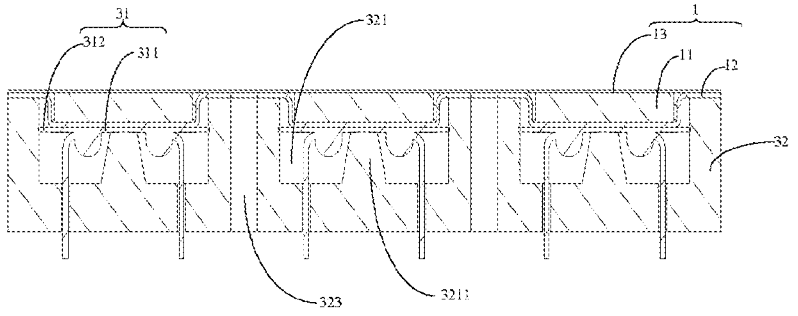
FIG. 13 is a schematic partial cross-sectional view of a first embodiment of a vaporization main unit according to this application.

Referring to FIG. 13, FIG. 13 is a schematic partial cross-sectional view of a first embodiment of a vaporization main unit according to this application.

In the first embodiment of the vaporization main unit 3, a groove 321 is formed on the mounting base 32 as the mounting portion 320. Namely, the mounting portion 320 forms the groove 321, and the aerosol-forming article 1 and the heating element 31 are arranged in the groove 321. Specifically, the groove 321 includes an accommodating cavity, and the accommodating cavity is configured to accommodate the aerosol-forming article 1. The heating element 31 is arranged in the groove 321, and the heating element 31 generates heat when energized to heat the aerosol-forming article 1. Specifically, the heating element 31 generates heat when energized to heat an encapsulation layer 12, and the encapsulation layer 12 conducts the heat to an aerosol-forming substrate 11 to form aerosols. Namely, the aerosol-forming article 1 is heated in a resistive manner. To improve the heating efficiency, the heating element 31 is attached to the encapsulation layer 12 of the aerosol-forming article 1. It may be understood that, one or more heating elements 31 may be arranged in the mounting portion 320, provided that the aerosol-forming article 1 is uniformly heated, which is specifically selected as required. The following is described by using an example in which one heating element 31 is arranged in the mounting portion 320.

In an implementation, a plurality of aerosol-forming articles 1 are arranged, the mounting base 32 is provided with a plurality of mounting portions 320, and the heating element 31 and the aerosol-forming article 1 are arranged in each mounting portion 320. Namely, a plurality of grooves 321 are provided on the mounting base 32, one groove 321 is used as one mounting portion 320, and one aerosol-forming article 1 is arranged in one groove 321. The vaporization main unit 3 includes a plurality of heating elements 31, and one heating element 31 is arranged corresponding to one mounting portion 320. Namely, one heating element 31 is arranged in one groove 321. A pin of the heating element 31 is electrically connected to the power supply 34 outside the accommodating cavity. The pin of the heating element 31 bypasses the accommodating cavity to be connected to the power supply 34, or the pin of the heating element 31 passes through a bottom wall of the groove 321 to be connected to the power supply 34.

To heat the aerosol-forming article 1 uniformly, a projection of the aerosol-forming article 1 on the heating element 31 at least covers a part of the heating element 31. Namely, an area of a surface of the heating element 31 in contact with the aerosol-forming article 1 is greater than an area of the surface of the heating element 31, so that the heating element 31 heats a whole cross-section of the aerosol-forming article 1 uniformly, thereby helping maintain the taste consistency.

Because the aerosol-forming article 1 and the heating element 31 are arranged in the groove 321 formed on the mounting base 32, namely, the heating element 31 heats the aerosol-forming article 1 in the groove 321. To improve the heating efficiency and reduce a heat loss, the mounting base 32 is made of a material with low thermal conduction and high temperature resistance such as ceramics or foams. In this embodiment, the mounting base 32 is made of a ceramic with low thermal conduction and high temperature resistance.

To avoid mutual impact between adjacent grooves 321, a third partition hole 323 is provided between adjacent grooves 321 on the mounting base 32, to further reduce the heat loss.

To further improve the heating efficiency, there is a gap between the side surface of the aerosol-forming article 1 and a side surface of the groove 321 to implement air heat insulation. The heating element 31 and an inner wall surface of the groove 321 are at least partially spaced to implement air heat insulation between the heating element 31 and the inner wall surface of the groove 321, so that heat of the heating element 31 for heating the aerosol-forming article 1 is mostly absorbed by the aerosol-forming article 1, and only a few of the heat is conducted to the mounting base 32, thereby reducing the heat loss.

In an implementation, the heating element 31 includes a heating body 311 and a mounting ear 312 fixedly connected to the heating body 311. The heating body 311 is connected to the side surface of the groove 321 through the mounting ear 312, namely, the heating body 311 is fixed to the groove 321 through the mounting ear 312. In addition, the heating body 311 and a bottom surface of the groove 321 are spaced to implement air heat insulation. It may be understood that, a smaller contact area between the mounting ear 312 and the side surface of the groove 321 better helps reduce the heat loss, provided that the mounting ear 312 can fix the heating body 311 onto the side surface of the groove 321. The fixing manner between the heating element 31 and the groove 321 is the same among the plurality of grooves 321.

In another implementation, a bump 3211 is provided on the bottom surface of the groove 321, and the heating element 31 is arranged on the bump 3211. The bump 3211 is in contact with a part of the heating element 31, and the heating element 31 and the side surface of the groove 321 are at least partially spaced to implement air heat insulation.

It may be understood that, a smaller contact area between the bump 3211 and the heating element 31 better helps reduce the heat loss, provided that the bump 3211 can fix the heating element 31 in the groove 321. The fixing manner between the heating element 31 and the groove 321 is the same among the plurality of grooves 321.

In this embodiment, to fix the position of the heating element 31 and prevent the heating element 31 from shaking in the groove 321, the heating element 31 includes a heating body 311 and a mounting ear 312 fixedly connected to the heating body 311. The heating body 311 and the side surface of the groove 321 are spaced, the heating body 311 is connected to the side surface of the groove 321 through the mounting ear 312, and the heating body 311 and the bottom surface of the groove 321 are spaced. A bump 3211 is provided on the bottom surface of the groove 321, and the heating body 311 is connected onto the bump 3211. That is, the heating body 311 is fixed in the groove 321 through the mounting ear 312 and the bump 3211. The fixing manner between the heating element 31 and the groove 321 is the same among the plurality of grooves 321.

The heating element 31 is set to be able to rise a temperature to 500° C. within 3 seconds, so that the heating element 31 can cause the aerosol-forming substrate 11 in the aerosol-forming article 1 to reach a volatilization temperature thereof quickly to release aerosols. Further, the entire heating efficiency is improved by using the high thermal conduction performance of the encapsulation layer 12 in the aerosol-forming article 1, the feature of quick heat conduction of the aerosol-forming substrate 11 due to a thin thickness, the low thermal conduction and high temperature resistance performance of the mounting base 32, and the air heat insulation between the mounting base 32 and the heating element 31 with the aerosol-forming article 1. Therefore, the aerosol-forming substrate 11 in the aerosol-forming article 1 can release aerosols quickly.

Figure 14A:
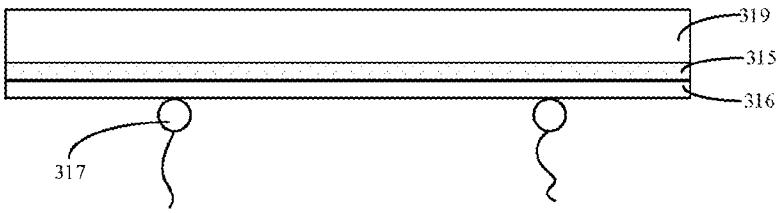
FIG. 14*a* is a schematic cross-sectional view of an implementation of a heating element in a first embodiment of a vaporization main unit according to this application.
Figure 14B:
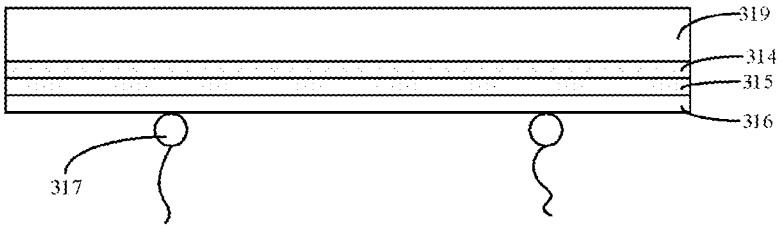
FIG. 14*b* is a schematic cross-sectional view of another implementation of a heating element in a first embodiment of a vaporization main unit according to this application.
Figure 15:
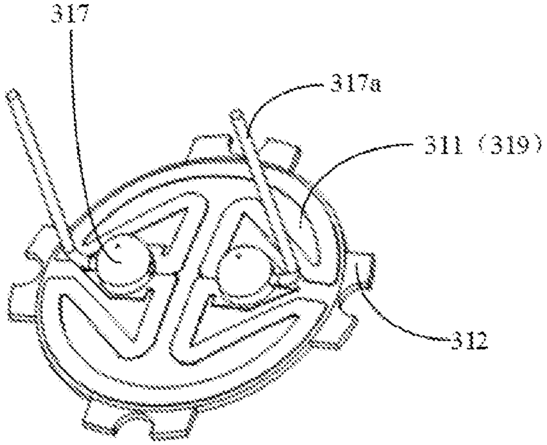
FIG. 15 is a three-dimensional schematic structural diagram of a heating element in a first embodiment of a vaporization main unit according to this application.

Referring to FIG. 14*a*, FIG. 14*b*, and FIG. 15, FIG. 14*a* is a schematic cross-sectional view of an implementation of a heating element in a first embodiment of a vaporization main unit according to this application, FIG. 14*b* is a schematic cross-sectional view of another implementation of a heating element in a first embodiment of a vaporization main unit according to this application, and FIG. 15 is a three-dimensional schematic structural diagram of a heating element in a first embodiment of a vaporization main unit according to this application.

The heating element 31 includes a heating body 311 and a mounting ear 312. The heating body 311 includes a heat conducting base layer 319, a heating circuit layer 315, and an electrode 317. Namely, the heating element 31 includes the heat conducting base layer 319, the heating circuit layer 315, and the electrode 317. The heat conducting base layer 319 includes a first surface and a second surface that are opposite to each other, and the second surface of the heat conducting base layer 319 is configured to be in contact with the aerosol-forming article 1. The heating circuit layer 315 is arranged on the first surface of the heat conducting base layer 319. The heating circuit layer 315 is arranged on the first surface of the heat conducting base layer 319, so that the entire surface of the heat conducting base layer 319 has uniform temperature Namely, the entire surface of the heat conducting base layer 319 is a high temperature region. The electrode 317 is arranged on a surface of one side of the heating circuit layer 315 away from the heat conducting base layer 319 and is electrically connected to the heating circuit layer 315.

The heating element 31 further includes a pin 317*a*, where one end of the pin 317*a* is connected to the electrode 317, and the other end of the pin is configured to connect to the power supply 34.

In the related art, most of the heating element is inserted in the aerosol-forming substrate, and a small part of the heating element is exposed to the outside of the aerosol-forming substrate. The part of the heating element inserted in the aerosol-forming substrate forms a high temperature region to heat the aerosol-forming substrate. The part exposed to the outside of the aerosol-forming substrate forms a low temperature region for ease of arrangement of assembly support points of leads. A lead region for arranging leads is provided in the low temperature region, to implement an electrical connection between the heating element and the controller. The heating element adopts a layout of a high temperature region, a low temperature region, and a lead region, and uses the low temperature region as assembly support points, which has poor temperature uniformity. The entire surface of the heating element 31 in this application is a high temperature region, which has uniform temperature, and the electrode 317 is assembled in the high temperature region.

The heating body 311 of the heating element 31 in this application is a sheet-like structure. The heating body 311 is set to be a sheet-like structure, so that the heating element 31 and the aerosol-forming article 1 are in contact in a large-scale manner. Therefore, the aerosol-forming article 1 is heated uniformly, and the taste consistency is maintained. The heating circuit layer 315 generates heat and conducts the heat to the heat conducting base layer 319. To improve the heat utilization of the heating circuit layer 315, a thickness of the heat conducting base layer 319 ranges from 0.1 mm to 1.0 mm. Optionally, the thickness of the heat conducting base layer 319 is 0.2 mm. A shape of the heat conducting base layer 319 may be manufactured into a circle or a square as required.

The heat conducting base layer 319 may be made of a heat conduction ceramic material. The heating element 31 further includes a protective layer 316, and the protective layer 316 is arranged on the surface of the side of the heating circuit layer 315 away from the heat conducting base layer 319 (as shown in FIG. 14*a*). A shape of the protective layer 316 is designed according to the shape of the heat conducting base layer 319, and a material of the protective layer 316 includes characteristics of high hardness and high temperature resistance, to protect the heating circuit layer 315 and improve the high temperature stability of the heating circuit layer 315. Optionally, the material of the protective layer 316 is ceramic glaze.

The heat conducting base layer 319 may alternatively be made of a metal material. The heating element 31 further includes an insulating layer 314 and a protective layer 316. The insulating layer 314 is arranged between the heat conducting base layer 319 and the heating circuit layer 315, and the protective layer 316 is arranged on a surface of one side of the heating circuit layer 315 away from the insulating layer 314, namely, the protective layer 316 is arranged on the surface of the side of the heating circuit layer 315 away from the heat conducting base layer 319 (as shown in FIG. 14*b*). Specifically, the heat conducting base layer 319 is made of a metal material with a high thermal conductivity, such as stainless steel, copper alloy, or aluminum alloy. Such a material has high strength and toughness, is hard to break, and has high reliability, so that a temperature field of the heat conducting base layer 319 has high uniformity under quick heating. Optionally, the material of the heat conducting base layer 319 is 430 stainless steel. Shapes of the insulating layer 314 and the protective layer 316 are designed according to the shape of the heat conducting base layer 319. A material of the protective layer 316 includes characteristics of high hardness and high temperature resistance, to protect the heating circuit layer 315 and improve the high temperature stability of the heating circuit layer 315. Optionally, the material of the protective layer 316 is ceramic glaze.

Because the heating body 311 is attached to the aerosol-forming article 1, only a surface of the heating body 311 is in contact with the aerosol-forming article 1, namely, only the second surface of the heat conducting base layer 319 is in contact with the aerosol-forming article 1. The insulating layer 314 does not need to be arranged on the first surface and the second surface of the heat conducting base layer 319, and the protective layer 316 on the two surfaces does not need to be arranged further, thereby simplifying a process procedure.

To further increase the contact area between the heating element 31 and the aerosol-forming article 1, the second surface of the heat conducting base layer 319 is set to be an arc surface structure, and a corresponding surface of the aerosol-forming article 1 in contact with the second surface of the heat conducting base layer 319 is set to be an arc surface. Namely, the surface of the aerosol-forming article 1 in contact with the heating element 31 is an arc surface. In addition, a bending direction and a bending degree of the surface of the aerosol-forming article 1 in contact with the heating element 31 and a bending direction and a bending degree of the heat conducting base layer 319 are set in an engagement manner.

Further, the heating circuit layer 315 generates heat and conducts the heat to the heat conducting base layer 319. To ensure that the temperature of the entire surface of the heat conducting base layer 319 is uniform, the first surface of the heat conducting base layer 319 is also set to be an arc surface, and a bending direction and a bending degree of the first surface are the same as the bending direction and the bending degree of the second surface. Namely, the first surface of the heat conducting base layer 319 is set to be an arc surface structure corresponding to the second surface. In an implementation, a protruding direction of the first surface and the second surface is a direction away from the electrode 317. In another implementation, a protruding direction of the first surface and the second surface is a direction approaching the electrode 317.

It may be understood that, when the heat conducting base layer 319 is made of a metal material, and the first surface and the second surface of the heat conducting base layer 319 are both an arc surface structure, to ensure that the temperature of the entire surface of the heat conducting base layer 319 is uniform, a cross-section of the insulating layer 314 is an arc, and a bending direction and a bending degree of the arc are the same as the bending direction and the bending degree of the second surface of the heat conducting base layer 319. The insulating layer 314 can still maintain relatively good stability and insulation performance under a high temperature.

The mounting ear 312 is arranged on the heat conducting base layer 319. Specifically, a plurality of spaced mounting ears 312 are arranged on a periphery of the heat conducting base layer 319, and the mounting ear 312 is configured to fix the heating element 31. A ratio of a contact length between the mounting ear 312 and the side surface of the heat conducting base layer 319 to a circumference of the side surface is less than 1:12. A smaller contact area between the mounting ear 312 and the heat conducting base layer 319 indicates fewer heat conducted by the heating body 311 to other components through the mounting ear 312, and better helps reduce a heat loss the heating element 31, provided that the size setting of the mounting ear 312 can fix the heating body 311.

It may be understood that, the mounting ear 312 may be formed by the periphery of the heat conducting base layer 319 through extending outward. Optionally, a thickness of the mounting ear 312 is less than the thickness of the heat conducting base layer 319, so that heat conducted by the heating body 311 to other components through the mounting ear 312 can be reduced, which helps reduce the heat loss of the heating element 31. The heating element 31 is mounted in the groove 321 through the mounting ear 312, and the heat conducting base layer 319 and the side wall of the groove 321 form an air gap, to improve the energy utilization of the heating element 31 through air heat insulation.

The heating circuit layer 315 in the heating element 31 includes a temperature coefficient of resistance (TCR) characteristic, and the heating circuit layer 315 is electrically connected to the controller 33 through the electrode 317. A temperature of the heating circuit layer 315 can be increased to 500° C. within 3 seconds. The entire heating circuit layer 315 is a high temperature region. The electrode 317 arranged on the heating circuit layer 315 is assembled in the high temperature region.

Figure 16:
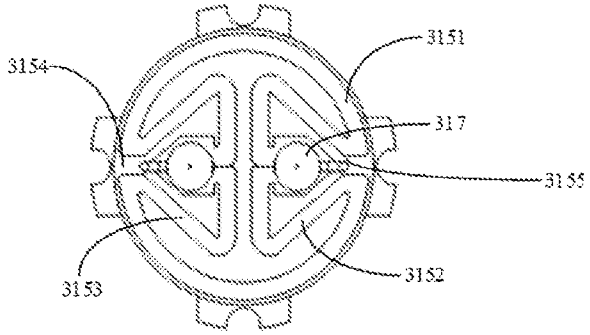
FIG. 16 is a schematic structural diagram of a heating circuit layer of a heating element in a first embodiment of a vaporization main unit according to this application.

Referring to FIG. 16, FIG. 16 is a schematic structural diagram of a heating circuit layer of a heating element in a first embodiment of a vaporization main unit according to this application.

The heating circuit layer 315 is a heating circuit, and patterns formed through bending of the heating circuit include a first section 3151, a second section 3152, and a third section 3153. The first section 3151 is arranged close to an edge of the heat conducting base layer 319 and includes two first notches 3154 provided opposite to each other. The second section 3152 and the third section 3153 are arranged in a region encircled by the first section 3151, the second section 3152 and the third section 3153 are both connected to the first section 3151, and patterns encircled by the second section 3152 and the third section 3153 are arranged symmetrically. Specifically, two ends of the second section 3152 are respectively connected to two end portions of one of the first notches 3154 of the first section 3151, and two ends of the third section 3153 are respectively connected to two end portions of the other of the first notches 3154 of the first section 3151. There are two electrodes 317, where one electrode 317 is connected to the second section 3152, and the other electrode 317 is connected to the third section 3153.

For example, a cross-section of the heat conducting base layer 319 is a circle. The first section 3151 of the heating circuit layer is arranged close to an edge of the insulating layer 314 to form a shape of a circular ring and includes two first notches 3154 provided opposite to each other. The second section 3152 and the third section 3153 are arranged in the circular ring encircled by the first section 3151, the second section 3152 and the third section 3153 are respectively in a shape of a triangle and form a second notch 3155 at a vertex angle, and the triangles encircled by the second section 3152 and the third section 3153 are arranged symmetrically. Two end portions of the second notch 3155 of the second section 3152 are respectively connected to two end portions of one of the first notches 3154 of the first section 3151, and two end portions of the second notch 3155 of the third section 3153 are respectively connected to two end portions of the other of the first notches 3154 of the first section 3151.

In the first embodiment of the vaporization main unit 3, the controller 33 controls the heating element 31 to work, to heat the aerosol-forming article 1 in the mounting portion 320 corresponding to the heating element 31.

Specifically, the controller 33 may control a plurality of heating elements 31 to work at the same time or control the plurality of heating elements 31 to work sequentially, which is specifically designed as required. When the controller 33 controls the plurality of heating elements 31 to work sequentially, aerosol-forming articles 1 in a plurality of mounting portions 320 are heated sequentially. Namely, after controlling one heating element 31 to heat one aerosol-forming article 1, the controller 33 continues to control a next heating element 31 to heat a next aerosol-forming article 1. A total working time for which the controller 33 controls each heating element 31 is a first preset duration, and the first preset duration is a time that the aerosol-forming substrate 11 in the aerosol-forming article 1 is consumed.

A heating total duration of the plurality of aerosol-forming articles 1 is the same as a heating total duration of a convention heat-not-burn (HNB) product, and a total number of times that aerosols can be inhaled after the plurality of aerosol-forming articles 1 are heated is the same as a number of times that aerosols are inhaled after the conventional HNB product is heated. The conventional HNB product is replaced with the plurality of aerosol-forming articles 1, the thickness of the aerosol-forming substrate 11 in the aerosol-forming article 1 is set to range from 0.5 mm to 3 mm to reduce a shape volume of the aerosol-forming substrate, and the plurality of aerosol-forming articles 1 are heated sequentially, so that the aerosol-forming substrate 11 can be prevented from being locally heated for a long time, and occurrence of a burnt flavor can be further prevented from affecting the taste, thereby improving the taste consistency In an embodiment, the controller 33 controls the next heating element 31 to work in advance before the total working time of the current heating element 31 reaches the first preset duration. Specifically, the controller 33 controls the next heating element 31 to work when the total working time of the current heating element 31 reaches a second preset duration, and the second preset duration is shorter than the first preset duration. A difference between the second preset duration and the first preset duration ranges from 5 seconds to 15 seconds. Optionally, the difference between the second preset duration and the first preset duration is 10 seconds.

The controller 33 controls the next heating element 31 to work when the total working time of the current heating element 31 reaches the second preset duration, so that the next aerosol-forming article 1 is preheated in advance when heating of the current aerosol-forming article 1 is near the end, and a release amount of aerosols is relatively stable, thereby preventing the release amount of aerosols from being decreased suddenly and helping improve the use experience of users.

In an embodiment, the controller 33 detects whether a heating process of the current heating element 31 is interrupted, and controls the next heating element 31 to work after the controller 33 detects that the heating process of the current heating element 31 is interrupted and the total working time of the interrupted heating element 31 reaches a third preset duration. When working of the heating element 31 does not reach the first preset duration, the aerosol-forming article 1 is still heated by residual heat after heating is interrupted, which may consume a small amount of aerosol-forming substrate. To prevent the heating element 31 from dry burning, the third preset duration is shorter than the second preset duration. A difference between the third preset duration and the second preset duration ranges from 1 seconds to 5 seconds. That is, when the controller 33 controls the plurality of heating elements 31 to work, the controller first detects whether a heating element 31 is interrupted during heating. If yes, the controller causes the interrupted heating element 31 to work first, namely, first heats the aerosol-forming article 1 that is not consumed, and causes the next heating element 31 to preheat the next aerosol-forming article 1 when the total heating time of the interrupted heating element 31 reaches the third preset duration.

Figure 17:
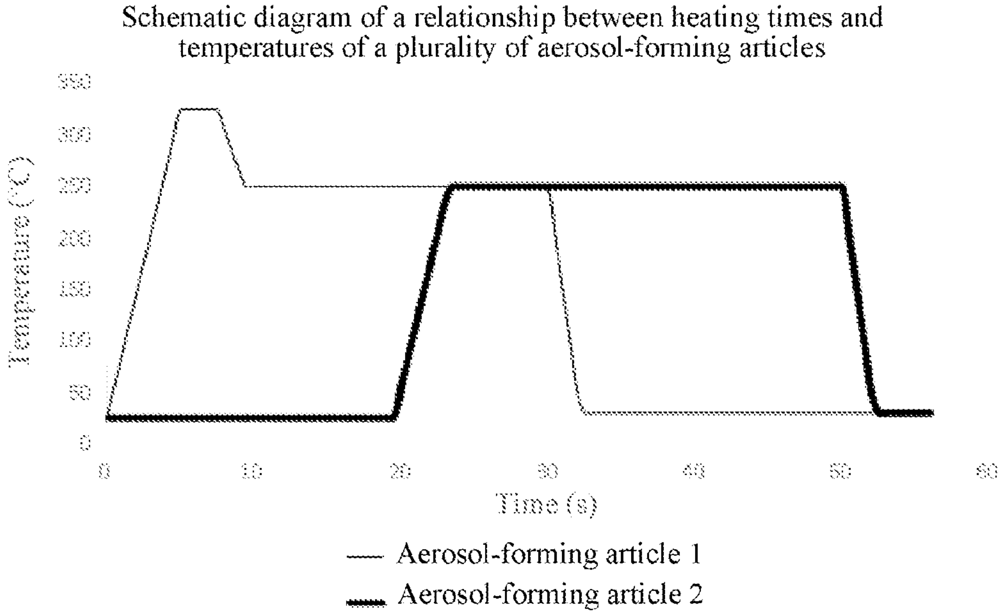
FIG. 17 is a schematic diagram of a relationship between a heating time and a temperature of an aerosol-forming article according to this application.

Referring to FIG. 17, FIG. 17 is a schematic diagram of a relationship between a heating time and a temperature of an aerosol-forming article according to this application.

A continuous working time for which the controller 33 controls a first heating element 31 is a first preset duration. The first preset duration of the first heating element 31 includes: a first time period, a second time period, and a third time period. The controller 33 controls the first heating element 31 to cause the aerosol-forming substrate 11 in the aerosol-forming article 1 to rise from a first temperature to a second temperature within the first time period, cause the aerosol-forming substrate 11 in the aerosol-forming article 1 to decrease from the second temperature to a third temperature within the second time period, cause the aerosol-forming substrate 11 in the aerosol-forming article 1 to keep at the third temperature with the third time period, and stop heating at the end of the third time period.

The first preset duration of the first heating element 31 further includes a fourth time period. The fourth time period is between the first time period and the second time period, and the aerosol-forming substrate 11 in the aerosol-forming article 1 is caused to keep at the second temperature within the fourth time period.

The first time period ranges from 5 seconds to 7 seconds, the second time period ranges from 3 seconds to 5 seconds, the third time period ranges from 22 seconds to 25 seconds, and the fourth time period ranges from 3 seconds to 4 seconds. The first temperature ranges from 20° C. to 30° C., the second temperature ranges from 300° C. to 350° C., and third temperature ranges from 220° C. to 280° C. Optionally, the first temperature is 25° C., the second temperature is 330° C., and the third temperature is 250° C. The third temperature is a temperature that the aerosol-forming substrate 11 can release aerosols.

In an implementation, a continuous working time for which the controller 33 controls a second heating element 31, a third heating element 31, and a fourth heating element 31 other than the first heating element 31 is a first preset duration. The first preset duration of the second heating element 31, the third heating element 31, and the fourth heating element 31 other than the first heating element 31 includes a fifth time period and a sixth time period. The controller 33 controls the heating element 31 to cause the aerosol-forming substrate 11 in the aerosol-forming article 1 to rise from the first temperature to the third temperature within the fifth time period, cause the aerosol-forming substrate 11 in the aerosol-forming article 1 to keep at the third temperature within the sixth time period, and stop heating at the end of the sixth time period. The fifth time period ranges from 2 seconds to 5 seconds, and the sixth time period ranges from 25 seconds to 28 seconds.

The aerosol-forming substrate 11 in the first aerosol-forming article 1 is heated to the second temperature higher than the temperature (the third temperature) for releasing aerosols by the first heating element 31 within the first time period, which helps the aerosol-forming substrate 11 to release aerosols quickly. Therefore, when a user inhales an aerosol-forming device, aerosols are inhaled within a shortest possible time, thereby improving the use experience of the user. It may be understood that, because the next heating element 31 is caused to preheat the next aerosol-forming article 1 when heating of the current heating element 31 is near the end, the second heating element 31, the third heating element 31, and the fourth heating element 31 other than the first heating element 31 do not need to cause the aerosol-forming substrates 11 in the corresponding second aerosol-forming article 1, third aerosol-forming article 1, and fourth aerosol-forming article 1 to first rise to the second temperature and then decrease to the third temperature, and instead, cause the aerosol-forming substrates to direct rise to the third temperature. Because when heating of the heating element 31 is near the end, most of the aerosol-forming substrate 11 in the corresponding aerosol-forming article 1 is consumed, and the concentration of the released aerosols is decreased. To ensure the concentration consistency of the released aerosols, the next heating element 31 is caused to heat the next aerosol-forming article 1 to release aerosols when heating of the heating element 31 is near the end, to ensure the taste consistency.

It may be understood that, after controlling one heating element 31 to work for the second preset duration, the controller 33 controls a next heating element 31 to work. In this case, the next heating element 31 corresponds to an aerosol-forming article 1 that is not heated. Namely, after the controller 33 detects that the aerosol-forming substrate 11 in the aerosol-forming article 1 is heated for the first preset duration, the controller 33 no longer controls the corresponding heating element 31 to work, to prevent the heating element 31 from dry burning and power wastes. The numbers of mounting portions 320, heating elements 31, and aerosol-forming articles 1 are correspondingly set and are designed as required.

Figure 18:
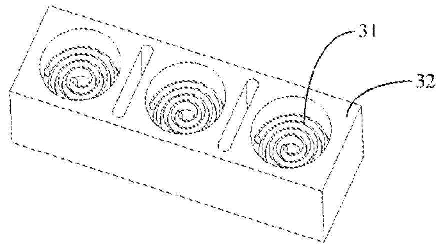
FIG. 18 is a schematic partial structural diagram of a second embodiment of a vaporization main unit according to this application.
Figure 19:
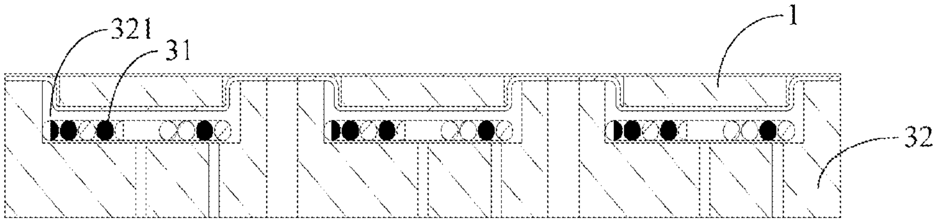
FIG. 19 is a schematic partial cross-sectional view of a second embodiment of a vaporization main unit according to this application.

Referring to FIG. 18 and FIG. 19, FIG. 18 is a schematic partial structural diagram of a second embodiment of a vaporization main unit according to this application; and FIG. 19 is a schematic partial cross-sectional view of a second embodiment of a vaporization main unit according to this application.

In the second embodiment of the vaporization main unit 3, the structure of the vaporization main unit 3 is basically the same as the structure in the first embodiment, functions and a control method of the controller 33 are the same as that in the first embodiment, and differences lie in the structure of the heating element 31 and a position relationship between the heating element 31 and the mounting portion 320. In the second embodiment, the aerosol-forming article 1 arranged on the vaporization main unit 3 may be the aerosol-forming article 1 shown in FIG. 5 to FIG. 9.

In this embodiment, the heating element 31 is an electromagnetic member, and the electromagnetic member is configured to provide a variable magnetic field.

Specifically, the electromagnetic member includes an electromagnetic coil, the encapsulation layer 12 is a heating layer, and the heating layer generates eddy currents in the magnetic field of the electromagnetic member to generate heat, to heat the aerosol-forming substrate 11 to form aerosols. Namely, eddy currents are generated when the variable magnetic field generated by the electromagnetic coil penetrates the metal heating layer, so that the metal heating layer generate heat and heats the aerosol-forming substrate 11. The electromagnetic coil is horizontally coiled to form a disc-type structure. Namely, after one end of the electromagnetic coil is fixed, the other end of the electromagnetic coil is wound along an outer side of the electromagnetic coil. The electromagnetic coil is arranged on the bottom surface of the groove 321, a side surface of the electromagnetic coil and the side surface of the groove 321 are spaced, and the electromagnetic coil and the aerosol-forming article 1 are spaced.

Figure 20:
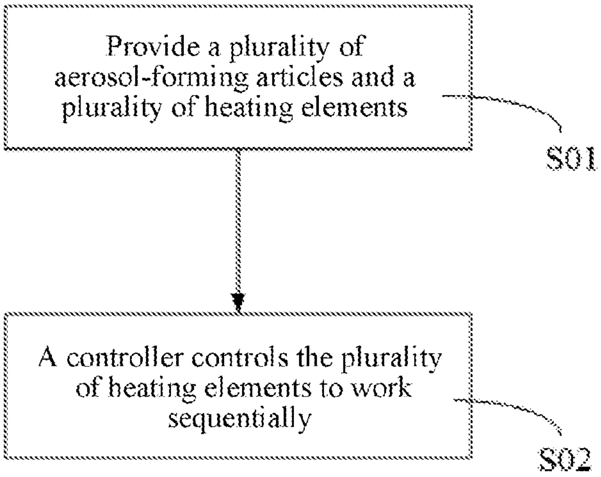
FIG. 20 is a schematic flowchart of an aerosol generation method according to this application.
Figure 21:
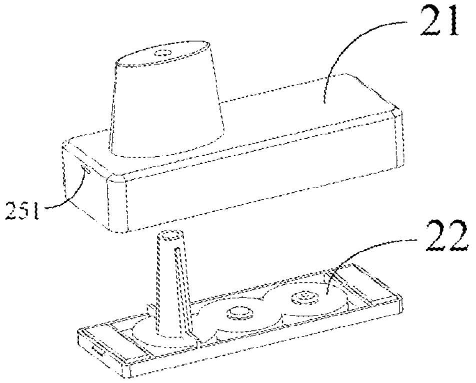
FIG. 21 is a schematic structural diagram of an air communication component according to this application.

An aerosol generation method is provided based on the working manner in which the controller 33 controls the heating element 31. Referring to FIG. 20, FIG. 20 is a schematic flowchart of an aerosol generation method according to this application.

Steps of the aerosol generation method are as follows:

S01: Provide a plurality of aerosol-forming articles and a plurality of heating elements.

Specifically, the aerosol-forming articles 1 and the heating elements 31 are arranged correspondingly. Namely, the number of aerosol-forming articles 1 is the same as the number of heating elements 31, and one heating element 31 heats one aerosol-forming article 1.

The aerosol-forming article 1 includes an aerosol-forming substrate 11 and an encapsulation layer 12. The encapsulation layer 12 covers at least a part of the aerosol-forming substrate 11, so that the encapsulation layer 12 isolates the aerosol-forming substrate 11 from the heating element 31.

The heating element 31 includes a resistance wire, and the resistance wire heats the encapsulation layer 12, so that the encapsulation layer 12 bakes the aerosol-forming substrate 11 to generate aerosols. Namely, the heating element 31 heats the encapsulation layer 12, so that the encapsulation layer 12 bakes the aerosol-forming substrate 11 to generate aerosols. Alternatively, the heating element 31 includes an electromagnetic coil, the electromagnetic coil and the encapsulation layer 12 (the encapsulation layer 12 is a heating layer) generate heat under the action of a magnetic field of the electromagnetic coil, and the encapsulation layer 12 heats the aerosol-forming substrate 11 to form aerosols. To improve the heating efficiency of the heating element 31, the encapsulation layer 12 is attached to the heating element 31.

S02: A controller controls the plurality of heating elements to work sequentially.

Specifically, the controller 33 controls the plurality of heating elements 31 to heat the aerosol-forming articles 1 sequentially. The plurality of heating elements 31 all work for a first preset duration, and the controller 33 is further configured to control a next heating element 31 to work when the heating element 31 works for a second preset duration. The second preset duration is shorter than the first preset duration.

In this method, the manner in which the controller 33 controls the heating element 31 can implement the functions of the controller 33 described above, which is not described in detail herein.

Figure 22:
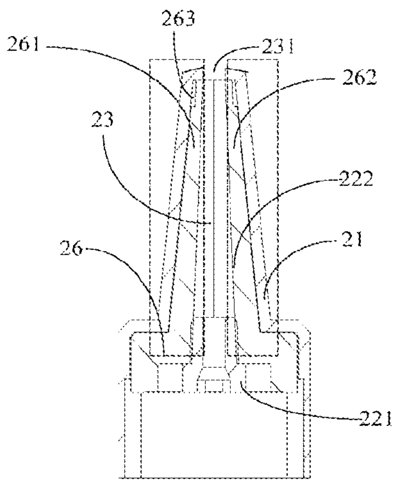
FIG. 22 is a schematic cross-sectional view of an air communication component according to this application.
Figure 23:
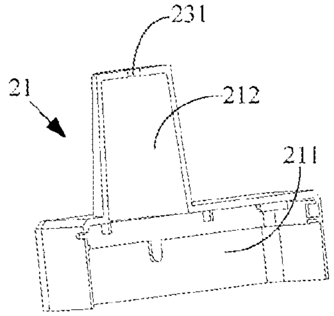
FIG. 23 is a schematic cross-sectional view of a top cover in an air communication component according to this application.
Figure 24:
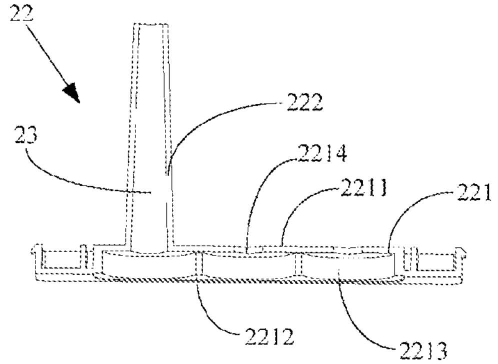
FIG. 24 is a schematic cross-sectional view of a bottom cover in an air communication component according to this application.
Figure 25:
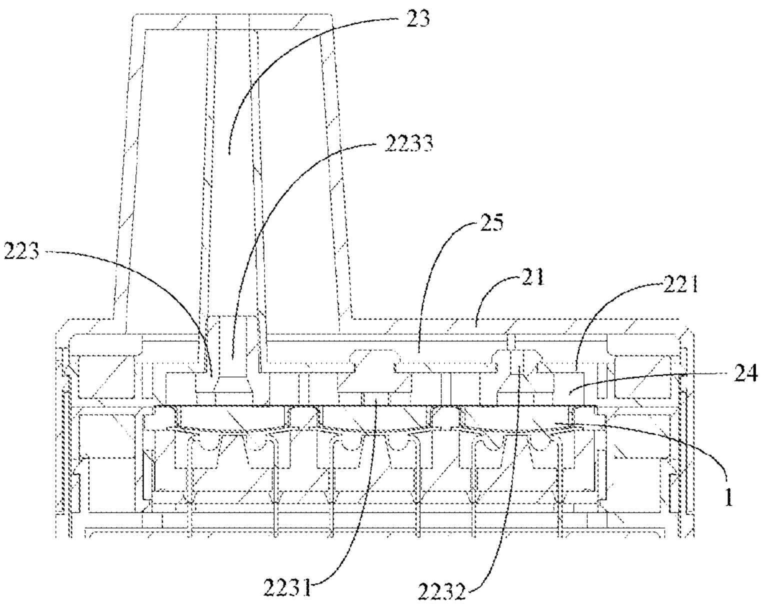
FIG. 25 is a schematic partial cross-sectional view of an aerosol-forming device according to this application.

Referring to FIG. 21 to FIG. 25, FIG. 21 is a schematic structural diagram of an air communication component according to this application, FIG. 22 is a schematic cross-sectional view of an air communication component according to this application, FIG. 23 is a schematic cross-sectional view of a top cover in an air communication component according to this application, FIG. 24 is a schematic cross-sectional view of a bottom cover in an air communication component according to this application, and FIG. 25 is a schematic partial cross-sectional view of an aerosol-forming device according to this application.

The air communication component 2 includes a top cover 21 and a bottom cover 22. The top cover 21 is provided with a first cavity 211 and a second cavity 212 that is in communication with each other. An air outlet hole 231 is provided on a cavity wall of the second cavity 212 for inhalation of a user. The bottom cover 22 includes a bottom cover body 221 and a protrusion 222 provided on the bottom cover body 221, where the bottom cover body 221 is arranged in the first cavity 211, and the protrusion 222 is provided in the second cavity 212. An air outlet channel 23 is provided on the protrusion 222.

The bottom cover 22 is configured to engage with one end of the vaporization main unit 3 provided with the aerosol-forming article 1 to form a vaporization cavity 24. Namely, the air communication component 2 engages with the vaporization main unit 3 to form the vaporization cavity 24. The aerosol-forming article 1 is arranged on one end of the vaporization main unit 3 close to the air communication component 2, and the aerosol-forming article 1 is located in the vaporization cavity 24. Specifically, the bottom cover body 221 includes a first surface 2211 and a second surface 2212 arranged opposite to the first surface 2211. The protrusion 222 is provided on the first surface 2211, the second surface 2212 includes a recess 2213, and the recess 2213 engages with the end of the vaporization main unit 3 provided with the aerosol-forming article 1 to form the vaporization cavity 24.

The bottom cover body 221 and a top wall of the first cavity 211 are spaced to form an air inlet channel 25.

Namely, the air inlet channel 25 is formed between the bottom cover 22 and the top cover 21, the air inlet channel 25 communicates the vaporization cavity 24 with external air, and the air outlet channel 23 communicates the vaporization cavity 24 with the air outlet hole 231.

The air inlet channel 25 is formed between the top cover 21 and the bottom cover 22. In this way, during inhalation of a user, external cool air continuously flows into the air inlet channel 25, and heat in the air inlet channel 25 is carried out in a process that an airflow flows toward the vaporization cavity 24, so that the top cover 21 is cooled down, namely, an outer wall of a suction nozzle component 2 is cooled down, and the cooling efficiency is improved, thereby preventing a high temperature from burning the user.

To cause the external air to flow from one end of a gap between the top cover 21 and the bottom cover 22 toward the other end of the gap after entering the suction nozzle component 2, an air inlet hole 251 is provided on a side wall of the first cavity 211.

The cavity wall of the second cavity 212 includes a top wall and an annular side wall, and the air outlet hole 231 is provided on the top wall of the second cavity 212. A top surface of the protrusion 222 abuts against the top wall of the second cavity 212, the annular side wall of the second cavity 212 and a side surface of the protrusion 222 are spaced, and a shielding sheet 26 is arranged between the annular side wall of the second cavity 212 and the side surface of the protrusion 222. The shielding sheet 26 divides a cavity formed by the protrusion 222 with the second cavity 212 and the first cavity 211 through engagement into a first space 261 and a second space 262. The external air enters the first space 261 through the air inlet hole 251, and enters the second space 262 from the first space 261 in an extending direction of the protrusion 222. It may be understood that, the shielding sheet 26 may be arranged on the side surface of the protrusion 222 or may be arranged on the annular side wall of the second cavity 212.

Referring to FIG. 25, in this embodiment, the shielding sheet 26 is arranged on the side surface of the protrusion 222. Specifically, the shielding sheet 26 is arranged on two sides of the protrusion 222. Because the bottom cover body 221 and the top wall of the first cavity 211 are spaced, one end of the shielding sheet 26 extends onto the bottom cover body 221, and a part of the shielding sheet 26 abuts against an inner wall surface of the first cavity 211. The other end of the shielding sheet 26 extends in a direction approaching the top wall of the second cavity 212, to divide the cavity formed by the protrusion 222 with the second cavity 212 and the first cavity 211 through engagement into the first space 261 and the second space 262.

In an implementation, one end of the shielding sheet 26 close to the second cavity 212 abuts against the top wall of the second cavity 212, and the end of the shielding sheet 26 close to the second cavity 212 is provided with a notch 263, to communicate the first space 261 with the second space 262. A size of the notch 263 is designed according to requirements on inhalation resistance and an air intake.

In another implementation, one end of the shielding sheet 26 close to the second cavity 212 abuts against the top wall of the second cavity 212, and the end of the shielding sheet 26 close to the second cavity 212 is provided with a through hole, to communicate the first space 261 with the second space 262. A size of the through hole is designed according to requirements on inhalation resistance and an air intake.

In still another implementation, there is a gap between one end of the shielding sheet 26 close to the second cavity 212 and the top wall of the second cavity 212, to communicate the first space 261 with the second space 262. A distance (the gap) between the end of the shielding sheet 26 close to the second cavity 212 and the top wall of the second cavity 212 ranges from 4 mm to 7 mm, and a size of the gap is designed according to requirements on inhalation resistance and an air intake.

In an implementation, the bottom cover 22 further includes an elastic member 223. The elastic member 223 is arranged on the bottom cover body 221 and configured to squeeze the aerosol-forming article 1, so that the aerosol-forming article 1 is tightly attached to the heating element 31 in the vaporization main unit 3. A mounting hole 2214 is provided on a bottom wall of the recess 2213 of the bottom cover body 221, and the mounting hole 2214 is configured to mount the elastic member 223. Namely, a structure size and an arrangement manner of the mounting hole 2214 and a structure size and an arrangement manner of the elastic member 223 are set in an engagement manner.

A surface of the elastic member 223 close to the aerosol-forming article 1 is provided with a recess 2231, and an air outlet hole of the aerosol-forming article 1 is exposed in the recess 2231, namely, aerosols vaporized by the aerosol-forming article 1 are released in the recess 2231. A side wall of the recess 2231 includes a through hole or a notch, so that the aerosols in the recess 2231 enters the vaporization cavity 24.

A plurality of elastic members 223 are arranged on the bottom cover body 221, where one elastic member 223 is arranged corresponding to the protrusion 222, and other elastic members 223 are arranged on the bottom cover body 221 in a direction away from the protrusion 221. A first communication hole 2232 is provided on an elastic member 223 that is farthest to the protrusion 222 and configured to communicate the air inlet channel 25 with the vaporization cavity 24. A second communication hole 2233 is provided on the elastic member 223 arranged corresponding to the protrusion 222 and configured to communicate the vaporization cavity 24 with the air outlet channel 23.

It may be understood that, an elastic member 223 is arranged on the bottom cover body 221, at least one recess 2231 is provided on one side of the elastic member 223 close to the aerosol-forming article 1, the recess 2231 is provided corresponding to the aerosol-forming article 1, and a notch or a through hole is provided on a side wall of the recess 2231, to engage with the aerosol-forming article 1 to form the vaporization cavity 24. A second communication hole 2233 is provided at a position of the elastic member 223 corresponding to the protrusion 222, to communicate the vaporization cavity 24 with the air outlet channel 23. A first communication hole 2232 is provided at a position of the elastic member 223 corresponding to an aerosol-forming article 1 that is farthest to the protrusion 222, to communicate the air inlet channel 25 with the vaporization cavity 24.

Figure 26:
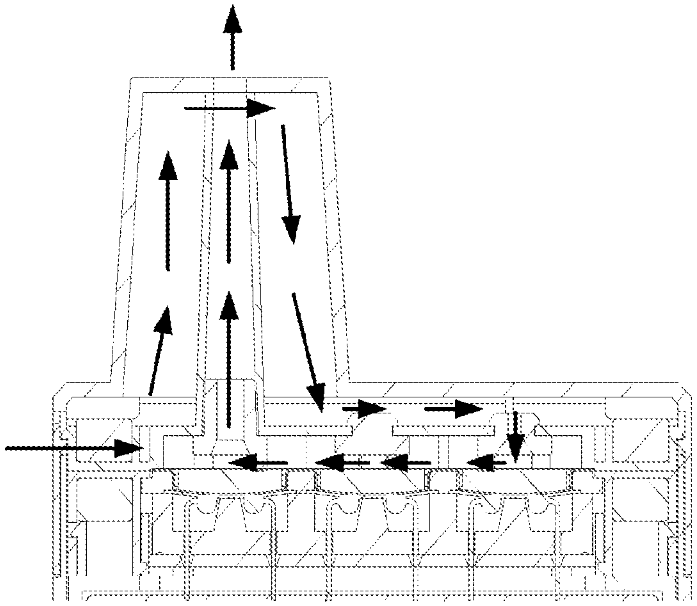
FIG. 26 is a schematic diagram of an air flowing direction in an air communication component according to this application.

Referring to FIG. 26, FIG. 26 is a schematic diagram of an air flowing direction in an air communication component according to this application.

After entering the air communication component through the air inlet hole 251, the external air enters the second space 262 from the first space 261 through the notch 263 on the shielding sheet 26 in the extending direction of the protrusion 222, then enters the gap between the bottom cover body 221 and the top wall of the first cavity 211, enters the vaporization cavity 24 through the first communication hole 2232, and enters the air outlet channel 23 with aerosols through the second communication hole 2233. The aerosols are then inhaled by the user from the air outlet hole 231.

To fully carry out the aerosols in the vaporization cavity 24, an arrangement position of the through hole or notch on the side wall of the first communication hole 2232 on the elastic member 223 that is farthest to the protrusion 222 faces away from an adjacent elastic member 223; and an arrangement position of the through hole or notch on the side wall of the second communication hole 2233 on the elastic member 223 arranged corresponding to the protrusion 222 faces away from an adjacent elastic member 223.

It may be understood that, the structures of the air communication component 2 and the vaporization main unit 3 described above are applicable to the structures of the fourth embodiment, the fifth embodiment, and the sixth embodiment of the aerosol-forming article 1 according to this application. For the structures of the first embodiment and the third embodiment of the aerosol-forming article 1 according to this application, this application further provides a vaporization main unit 3 of another structure.

Figure 27:
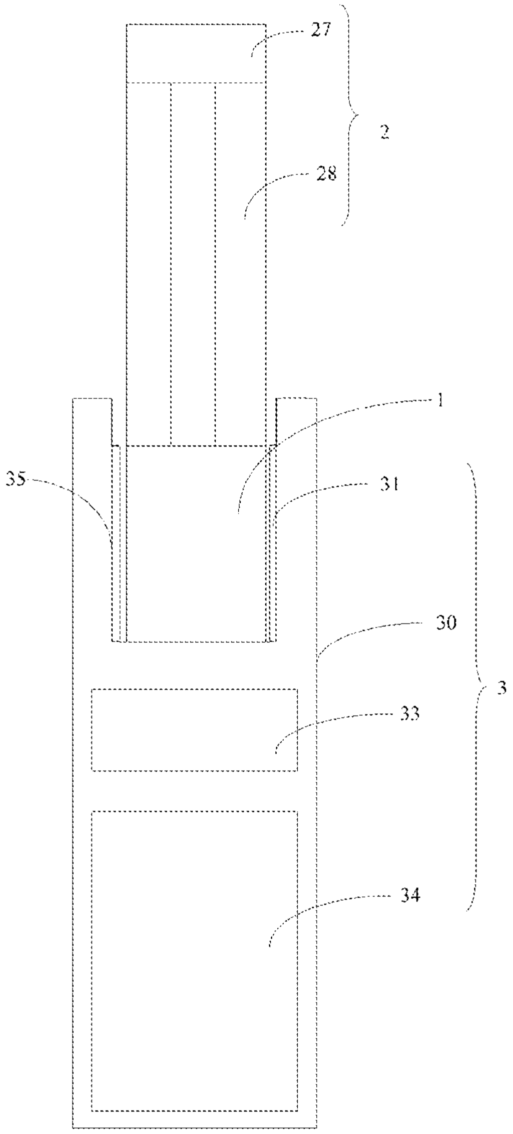
FIG. 27 is a schematic structural diagram of another aerosol-forming device according to this application.

Referring to FIG. 27, FIG. 27 is a schematic structural diagram of another aerosol-forming device according to this application.

The aerosol-forming device includes an aerosol-forming article 1, an air communication component 2, and a vaporization main unit 3. The vaporization main unit 3 includes a housing 30, a heating element 31, a controller 33, and a power supply 34. The controller 33 and the power supply 34 are arranged in a cavity formed by the housing 30, and the controller 33 controls the power supply 34 to supply power to the heating element 31. One end of the housing 30 forms a mounting groove 35, and the mounting groove 35 is configured to accommodate the heating element 31 and the aerosol-forming article 1. Specifically, the heating element 31 is arranged on a side wall of the mounting groove 35, and the aerosol-forming article 1 is arranged in a space encircled by the heating element 31.

The air communication component 2 includes a cooling member 28 and a filter member 27. The cooling member 28 is arranged between the aerosol-forming article 1 and the filter member 27. The cooling member 28 is a tubular body, and the tubular body forms a communication hole. In an embodiment, one end of the cooling member 28 is inserted into the mounting groove 35 and connected to the aerosol-forming article 1, and the other end of the cooling member is arranged outside the mounting groove 35 and connected to the filter member 27. An encapsulation layer 12 in the aerosol-forming article 1 heats an aerosol-forming substrate 11 to generate aerosols, and the aerosols reach the filter member 27 through the communication hole. There is a heat loss in a process that the aerosols pass through the communication hole, so that a temperature of the aerosols is reduced and then transmitted to a mouth of the user through the filter member 27, thereby preventing the user from being burnt by an excessively high temperature of the aerosols. A material of the cooling member 28 is a heat resistant and dense material. For example, the material of the cooling member 28 may be plastics or ceramics.

The filter member 27 is mounted on one end of the cooling member 28 away from the mounting groove 35, and the filter member 27 covers an opening of one end of the communication hole away from the mounting groove 35, so that the aerosols in the communication hole are transmitted to the mouth of the user through the filter member 27. The filter member 27 is configured to filter out the aerosol-forming substrate 11 entering the communication hole along with an airflow of the aerosols. A material of the filter member 27 may be a porous material, such as a cotton core.

The structures of the vaporization main unit 3 and the air communication component 2 in this embodiment are applicable to the structures of the first embodiment and the third embodiment of the aerosol-forming article 1 according to this application. The heating element 31 is a resistive heating body.

Figure 28:
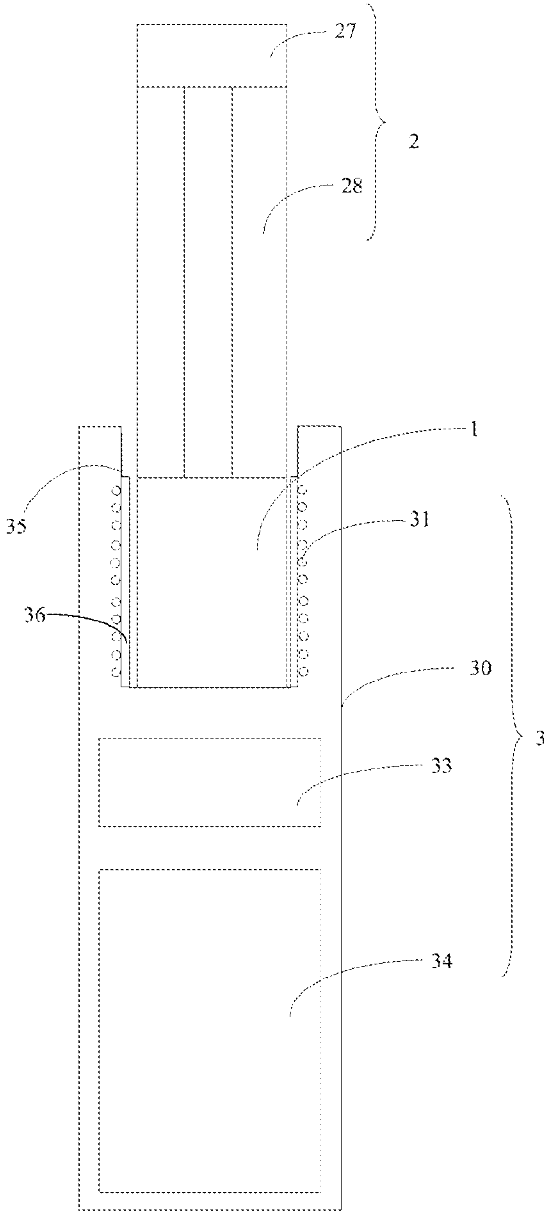
FIG. 28 is a schematic structural diagram of still another aerosol-forming device according to this application.

Referring to FIG. 28, FIG. 28 is a schematic structural diagram of still another aerosol-forming device according to this application.

The aerosol-forming device includes an aerosol-forming article 1, an air communication component 2, and a vaporization main unit 3. The aerosol-forming device in FIG. 28 and the aerosol-forming device in FIG. 27 are basically the same in structure, and a difference lies in that, the heating element 31 is an electromagnetic heating body, the heating element 31 includes a spiral coil, and a mounting sleeve 36 is arranged in the spiral coil and configured to accommodate the aerosol-forming article 1.

Specifically, the spiral coil and the mounting sleeve 36 are together arranged in the mounting groove 35, the spiral coil is arranged on an outer surface of the mounting sleeve 36, and a cavity formed by the mounting sleeve 36 is configured to accommodate the aerosol-forming article 1. In an implementation, the spiral coil is embedded in a side wall of the mounting groove 35 (as shown in FIG. 28). In another implementation, the spiral coil is in interference fit with the side wall of the mounting groove 35 or fixed to the mounting groove 35 through a structure such as a buckle.

For a case that the heating element 31 is a resistive heating body, this application provides an aerosol generation method, and steps are as follows:

S11: Provide an aerosol-forming article, the aerosol-forming article including an aerosol-forming substrate and an encapsulation layer.

Specifically, the aerosol-forming article 1 includes an aerosol-forming substrate 11 and an encapsulation layer 12. The encapsulation layer 12 covers at least a part of the aerosol-forming substrate 11, so that the encapsulation layer 12 isolates the aerosol-forming substrate 11 from the heating element 31.

S12: A heating element heats the encapsulation layer, so that the encapsulation layer bakes the aerosol-forming substrate to generate aerosols.

Specifically, the heating element 31 is configured to heat the aerosol-forming article 1. The heating element 31 includes a resistance wire, and the resistance wire heats the encapsulation layer 12, so that the encapsulation layer 12 bakes the aerosol-forming substrate 11 to generate aerosols. Namely, the heating element 31 heats the encapsulation layer 12, so that the encapsulation layer 12 bakes the aerosol-forming substrate 11 to generate aerosols. To improve the heating efficiency of the heating element 31, the encapsulation layer 12 is attached to the heating element 31.

Any combination of the structure of the aerosol-forming article 1, the structure of the suction nozzle component 2, and the structure of the vaporization main unit 3 described above is applicable to implementing the method, so that the structure of a device corresponding to the method is not described in detail.

For a case that the heating element 31 is an electromagnetic heating body, this application provides an aerosol generation method, and steps are as follows:

S31: Provide an aerosol-forming article, the aerosol-forming article including an aerosol-forming substrate and an encapsulation layer.

Specifically, the aerosol-forming article 1 includes an aerosol-forming substrate 11 and an encapsulation layer 12. The encapsulation layer 12 covers at least a part of the aerosol-forming substrate 11, so that the encapsulation layer 12 isolates the aerosol-forming substrate 11 from the heating element 31.

S32: Provide a variable magnetic field for the aerosol-forming article through an electromagnetic member, so that the encapsulation layer generates eddy currents to generate heat, to heat the aerosol-forming substrate.

Specifically, the heating element 31 is an electromagnetic member. The electromagnetic member is energized, a variable magnetic field is generated after the electromagnetic member is energized, and eddy currents are generated when the variable magnetic field generated by the electromagnetic member penetrates the encapsulation layer 12, so that the encapsulation layer 12 generates heat and heats the aerosol-forming substrate 11.

Any combination of the structure of the aerosol-forming article 1, the structure of the suction nozzle component 2, and the structure of the vaporization main unit 3 described above is applicable to implementing the method, so that the structure of a device corresponding to the method is not described in detail.

The aerosol-forming article according to this application includes: an aerosol-forming substrate; a heating layer, where the heating layer encircles a concave portion, and the aerosol-forming substrate is arranged in the concave portion; and a cover layer, covering at least a part of the heating layer and an opening of the concave portion, where the aerosol-forming substrate is located between the heating layer and the cover layer; a through hole is provided at a position of the cover layer corresponding to the opening; and the heating layer is configured to generate eddy currents in a magnetic field to generate heat, so that the aerosol-forming substrate is heated to form aerosols. According to the aerosol-forming article provided in this application, eddy currents are generated in a magnetic current to generate heat, and the aerosol-forming substrate is further heated, thereby preventing occurrence of a burnt flavor or odor caused by heating of a heating layer that is reused and improving the taste of aerosols.

The foregoing descriptions are implementations of this application, and the protection scope of this application is not limited thereto. All equivalent structure or process changes made according to the content of this specification and accompanying drawings in this application or by directly or indirectly applying this application in other related technical fields shall fall within the protection scope of this application.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a”

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An aerosol-forming article, comprising:

an aerosol-forming substrate;

a heating layer encircling at least one concave portion, the aerosol-forming substrate being arranged in the at least one concave portion; and a cover layer covering at least a part of the heating layer and an opening of the at least one concave portion, wherein the aerosol-forming substrate is located between the heating layer and the cover layer, wherein a through hole is provided at a position of the cover layer corresponding to the opening, wherein the heating layer is configured to generate eddy currents in a magnetic field to generate heat so as to heat the aerosol-forming substrate to form aerosols, wherein the aerosol-forming substrate gathers to form a layered body, wherein a bottom wall of the at least one concave portion is attached to a bottom surface of the aerosol-forming substrate, and wherein a distance between a side wall of the at least one concave portion and a side surface of the aerosol-forming substrate ranges from 0.1 mm to 1.0 mm.

2. The aerosol-forming article of claim 1, wherein the at least one concave portion comprises an annular side wall and a bottom wall, and wherein an outer side of the annular side wall comprises a hanger loop.

3. The aerosol-forming article of claim 2, wherein the at least one concave portion comprises a plurality of concave portions, wherein the heating layer encircles the plurality of concave portions, wherein annular side walls of adjacent concave portions are spaced, and wherein adjacent concave portions of the plurality of concave portions share a same hanger loop.

4. The aerosol-forming article of claim 3, wherein the first partition hole is provided on a hanger loop shared by the adjacent concave portions.

5. The aerosol-forming article of claim 2, wherein the heating layer encircles the at least one concave portion, wherein the at least one concave portion comprises a plurality of concave portions, wherein adjacent concave portions of the plurality of concave portions are spaced, and wherein hanger loops of adjacent concave portions are spaced.

6. The aerosol-forming article of claim 1, wherein a thickness of the heating layer ranges from 0.05 mm to 0.3 mm.

7. The aerosol-forming article of claim 1, wherein the heating layer comprises an aluminum foil.

8. The aerosol-forming article of claim 1, wherein a thickness of the cover layer ranges from 0.02 mm to 0.1 mm, and wherein the cover layer comprises an aluminum foil.

9. The aerosol-forming article of claim 1, wherein a thickness of the aerosol-forming substrate ranges from 0.5 mm to 3 mm, and wherein a depth of the at least one concave portion ranges from 0.5 mm to 3 mm.

10. The aerosol-forming article of claim 1, wherein a shape of a cross-section of the aerosol-forming substrate is a circle, and wherein a diameter of the aerosol-forming substrate ranges from 3.0 mm to 20 mm.

* * * * *